US011936209B2

(12) United States Patent
Kwon et al.

(10) Patent No.: US 11,936,209 B2
(45) **Date of Patent: *Mar. 19, 2024**

(54) FOREIGN SUBSTANCE DETECTION METHOD FOR WIRELESS CHARGING AND APPARATUS THEREFOR

(71) Applicant: LG INNOTEK CO., LTD., Seoul (KR)

(72) Inventors: Yong Il Kwon, Seoul (KR); Jae Hee Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,562

(22) Filed: Mar. 9, 2023

(65) Prior Publication Data

US 2023/0216354 A1 Jul. 6, 2023

Related U.S. Application Data

(63) Continuation of application No. 17/340,666, filed on Jun. 7, 2021, now Pat. No. 11,632,002, which is a (Continued)

(30) Foreign Application Priority Data

Dec. 8, 2016 (KR) ........................ 10-2016-0166866

(51) Int. Cl.

*H02J 50/60* (2016.01)
*H02J 7/02* (2016.01)
*H02J 50/12* (2016.01)

(52) U.S. Cl.

CPC ................ *H02J 50/60* (2016.02); *H02J 7/02* (2013.01); *H02J 50/12* (2016.02)

(58) Field of Classification Search

None

See application file for complete search history.

(56) References Cited

U.S. PATENT DOCUMENTS 9,124,307 B2 9/2015 Kudo et al.
9,530,558 B2 12/2016 Nakano et al.
(Continued)

FOREIGN PATENT DOCUMENTS

EP 3 480 588 A1 5/2019
JP 2010-183705 A 8/2010
(Continued)

*Primary Examiner* — Thomas J. Hiltunen

(74) *Attorney, Agent, or Firm* — Birch, Stewart, Kolasch & Birch, LLP

(57) ABSTRACT

A method of controlling a wireless power transmitter to detect a foreign object can include in response to a wireless power receiver being placed in a charging area of the wireless power transmitter, determining a current peak frequency; collecting a communication error count related to communication between the wireless power transmitter and the wireless power receiver; determining a reference frequency for detecting the foreign object based on a reference peak frequency received from the wireless power receiver; and determining that the foreign object is present within the charging area based on the current peak frequency, the communication error count and the reference frequency.

10 Claims, 17 Drawing Sheets

Related U.S. Application Data continuation of application No. 16/467,865, filed as application No. PCT/KR2017/014417 on Dec. 8, 2017, now Pat. No. 11,056,924.

(56) References Cited

U.S. PATENT DOCUMENTS

| | | | | |
|---|---|---|---|---|
| 9,843,226 | B2 | 12/2017 | Lee et al. | |
| 9,882,437 | B2 | 1/2018 | Nakano et al. | |
| 10,291,078 | B2 | 5/2019 | Watanabe et al. | |
| 10,432,036 | B2 | 10/2019 | Li et al. | |
| 10,523,061 | B2 | 12/2019 | Nakano et al. | |
| 11,056,924 | B2 * | 7/2021 | Kwon | H02J 50/60 |
| 11,349,347 | B2 | 5/2022 | Park et al. | |
| 11,355,281 | B2 | 6/2022 | Kim et al. | |
| 11,355,971 | B2 | 8/2022 | Youn et al. | |
| 11,632,002 | B2 * | 4/2023 | Kwon | H04B 5/0081<br>307/104 |
| 2011/0196544 | A1 | 8/2011 | Baarman et al. | |
| 2013/0063160 | A1 | 3/2013 | Nakano et al. | |
| 2013/0099592 | A1 | 4/2013 | Abe | |
| 2014/0077617 | A1 | 3/2014 | Nakano et al. | |
| 2014/0084857 | A1 | 3/2014 | Liu et al. | |
| 2014/0232199 | A1 | 8/2014 | Jung et al. | |
| 2014/0266036 | A1 | 9/2014 | Jung et al. | |
| 2016/0141882 | A1 | 5/2016 | Ichikawa | |
| 2016/0226311 | A1 | 8/2016 | Kanno | |
| 2016/0241086 | A1 | 8/2016 | Jung et al. | |
| 2018/0241267 | A1 | 8/2018 | Muratov et al. | |
| 2019/0181684 | A1 | 6/2019 | Kozakai et al. | |
| 2019/0222066 | A1 | 7/2019 | Kozakai et al. | |

FOREIGN PATENT DOCUMENTS

| | | | |
|---|---|---|---|
| JP | 2012-16171 | A | 1/2012 |
| JP | 2015-46990 | A | 3/2015 |
| KR | 10-2014-0113147 | A | 9/2014 |
| KR | 10-2015-0003408 | A | 1/2015 |
| KR | 10-2015-0059069 | A | 5/2015 |
| KR | 10-2016-0011143 | A | 1/2016 |
| KR | 10-2016-0022823 | A | 3/2016 |
| WO | WO 2013/190809 | A1 | 12/2013 |
| WO | WO 2014/203346 | A1 | 12/2014 |

* cited by examiner

FIG. 5

| HEADER | PACKET TYPE | MESSAGE SIZE (BYTE) |
|---|---|---|
| 0x01 | Signal Strength | 1 |
| 0x02 | End Power Transfer | 1 |
| 0x06 | Power Control Hold-off | 1 |
| 0x51 | Configuration | 5 |
| 0x71 | Identification | 7 |
| 0x81 | Extended Identification | 8 |
| 0x07 | General Request | 1 |
| 0x20 | Specific Request | 2 |
| 0x22 | FOD Status | 2 |
| 0x03 | Control Error | 1 |
| 0x09 | Renegotiate | 1 |
| 0x31 | 24-bit Received Power | 3 |
| 0x04 | 8-bit Received Power | 1 |
| 0x05 | Charge Status | 1 |

| | b7 | b6 | b5 | b4 | b3 | b2 | b1 | b0 |
|---|---|---|---|---|---|---|---|---|
| B0 | FIRST DATA | | | | | | MODE | |
| B1 | SECOND DATA | | | | | | | |

1503

1504

| MODE [b1 b0] | DESCRIPTION |
|---|---|
| 00 | - FIRST DATA : Reserved<br>- SECOND DATA : REFERENCE QUALITY FACTOR VALUE |
| 01 | - FIRST DATA : Reserved<br>- SECOND DATA : REFERENCE PEAK FREQUENCY VALUE |
| 10 | Reserved |
| 11 | Reserved |

1505

| MODE [b1 b0] | DESCRIPTION |
|---|---|
| 00 | - FIRST DATA : REFERENCE PEAK FREQUENCY VALUE<br>- SECOND DATA : REFERENCE QUALITY FACTOR VALUE |
| 01 | Reserved |
| 10 | Reserved |
| 11 | Reserved |

FIG. 14

| CLASSIFICATION | ONLY RECEIVER PLACED | | RECEIVER AND FOREIGN OBJECT PLACED (FOREIGN OBJECT : FO#4) | | | | | |
|---|---|---|---|---|---|---|---|---|
| | | | POSITION OF FOREIGN OBJECT IN CHARGING AREA | | | | | |
| | | | CENTER OF CHARGING AREA | | MOVEMENT FROM CENTER BY 10mm | | MOVEMENT FROM CENTER BY 20mm | |
| | PEAK FREQUENCY | Q | PEAK FREQUENCY | Q | PEAK FREQUENCY | Q | PEAK FREQUENCY | Q |
| FIRST RECEIVER | 97.36 kHz | 55.8 | **106.72 kHz** | 43.1 | **105.51 kHz** | 45.2 | **101.39 kHz** | 52.6 |
| SECOND RECEIVER | 92.64 kHz | 64 | **105.05 kHz** | 44.5 | **104.22 kHz** | 49.7 | **99.06 kHz** | 58.1 |
| THIRD RECEIVER | 93.58 kHz | 54.56 | **104.76 kHz** | 41.67 | **102.64 kHz** | 45.33 | **98.96 kHz** | 52.00 |
| THIRD RECEIVER | 95.29 kHz | 58.56 | **107.47 kHz** | 45.00 | **104.44 kHz** | 50.33 | **99.10 kHz** | 57.00 |

1910 1920 1930 1940 1950

FOREIGN SUBSTANCE DETECTION METHOD FOR WIRELESS CHARGING AND APPARATUS THEREFOR

CROSS REFERENCE TO RELATED APPLICATIONS

This application is a Continuation of application Ser. No. 17/340,666, filed on Jun. 7, 2021, which is a Continuation of application Ser. No. 16/467,865, filed on Jun. 7, 2019 (now U.S. Pat. No. 11,056,924, issued on Jul. 6, 2021), which is the National Phase of PCT International Application No. PCT/KR2017/014417, filed on Dec. 8, 2017, which claims priority under 35 U.S.C. 119(a) to Patent Application No. 10-2016-0166866, filed in the Republic of Korea on Dec. 8, 2016, all of which are hereby expressly incorporated by reference into the present application.

TECHNICAL FIELD

Embodiments relate to wireless power transmission technology and, more particularly, to a method of detecting a foreign object placed in a charging area of a wireless power transmitter, and an apparatus therefor.

BACKGROUND ART

Recently, as information and communication technology has been rapidly developed, a ubiquitous society based on information and communication technology is being developed.

In order to connect information communication devices anytime and anywhere, sensors equipped with a computer chip having a communication function should be installed in all social facilities. Accordingly, supplying power to such devices or sensors is a new challenge. In addition, as the types of mobile devices such as music players such as Bluetooth handsets or iPods as well as mobile phones have rapidly increased, it is necessary for users to take more time and effort to charge batteries. As a method of solving such problems, wireless power transmission technology has recently attracted attention.

Wireless power transmission or wireless energy transfer refers to technology for wirelessly transmitting electric energy from a transmitter to a receiver using the magnetic induction principle. In the 1800s, electric motors or transformers using the electromagnetic induction principle began to be used and, thereafter, attempts have been made to radiate electromagnetic waves such as high-frequency waves, microwaves and lasers to transfer electric energy. Frequently used electric toothbrushes and some electric shavers are charged using the electromagnetic induction principle.

Up to now, wireless energy transfer methods may be broadly divided into magnetic induction, electromagnetic resonance and radio frequency (RF) transmission of a short-wavelength radio frequency.

The magnetic induction method uses a phenomenon that, when two coils are located adjacent to each other and then current is applied to one coil, a magnetic flux is generated to cause an electromotive force in the other coil, and is rapidly being commercialized in small devices such as mobile phones. The magnetic induction method may transfer power of up to several hundred kilowatts (kW) and has high efficiency. However, since a maximum transmission distance is 1 centimeter (cm) or less, a device to be charged should be located adjacent to a charger or the floor.

The electromagnetic resonance method uses an electric field or a magnetic field instead of using electromagnetic waves or current. The electromagnetic resonance method is rarely influenced by electromagnetic waves and thus is advantageously safe for other electronic devices and human. In contrast, this method may be used in a limited distance and space and energy transmission efficiency is somewhat low.

The short-wavelength wireless power transmission method (briefly referred to as the RF transmission method) takes advantage of the fact that energy may be directly transmitted and received in the form of radio waves. This technology is an RF wireless power transmission method using a rectenna. A rectenna is a combination of an antenna and a rectifier and means an element for directly converting RF power into DC power. That is, the RF method is technology for converting AC radio waves into DC. Recently, as efficiency of the RF method has been improved, studies into commercialization of the RF method have been actively conducted Wireless power transmission technology may be used not only in mobile related industries but also in various industries such as IT, railroads and home appliances.

If a conductor which is not a wireless power receiver, that is, a foreign object (FO), is present in a wireless charging area, an electromagnetic signal received from a wireless power transmitter may be induced in the FO, thereby increasing in temperature. For example, the FO may include coins, clips, pins, and ballpoint pens.

If an FO is present between a wireless power receiver and a wireless power transmitter, wireless charging efficiency may be significantly lowered, and the temperatures of the wireless power receiver and the wireless power transmitter may increase due to increase in ambient temperature of the FO. If the FO located in the charging area is not removed, power waste may occur and the wireless power transmitter and the wireless power receiver may be damaged due to overheating.

Accordingly, accurate detection of the FO located in the charging area is becoming an important issue in wireless charging technology.

In the related art, a method of determining whether an FO is present based on a threshold value determined based on a reference quality factor value and a measured quality factor value and a method of determining whether an FO is present on a wireless power transmission path based on wireless power path loss were disclosed. However, these methods have FO detection accuracy which deteriorates according to the type of a receiver and a transmitter.

DISCLOSURE

Technical Problem

Embodiments provide a foreign object detection method for wireless charging and an apparatus and system therefor.

Embodiments provide a foreign object detection method capable of more accurately detecting a foreign object, by comparing a current peak frequency with a foreign object reference frequency (frequency boundary value) determined based on a reference peak frequency, and an apparatus therefor.

Embodiments provide a foreign object detection method capable of more accurately detecting a foreign object, by determining whether a foreign object is present based on statistical data of a communication error count as well as peak frequency change, and an apparatus and system therefor.

The technical problems solved by the embodiments are not limited to the above technical problems and other technical problems which are not described herein will become apparent to those skilled in the art from the following description.

Technical Solution

Embodiments provide a foreign object detection method, and an apparatus therefor.

A foreign object detection method of a wireless power transmitter according to an embodiment may include searching for a current peak frequency having a maximum quality factor value within an available frequency band when an object placed in a charging area is detected, receiving a foreign object detection status packet including a reference peak frequency from a wireless power receiver, determining a foreign object detection reference frequency based on the reference peak frequency, and comparing the current peak frequency with the foreign object detection reference frequency to determine whether a foreign object is present.

Here, the determining of the foreign object detection reference frequency may include determining a tolerance and determining the foreign object detection reference frequency by a sum of the reference peak frequency and the tolerance.

For example, the tolerance may be determined based on peak frequency change according to movement of a receiver in the charging area.

In another example, the tolerance may be determined based on peak frequency change according to a difference between types of wireless power transmitters.

In another example, the tolerance may be determined based on the larger value of maximum peak frequency change according to movement of a receiver in the charging area and maximum peak frequency change according to a difference between types of wireless power transmitters.

In addition, when the current peak frequency is greater than the foreign object detection reference frequency, it may be determined that the foreign object is present.

In addition, the current peak frequency may be searched after power transfer is temporarily stopped before entering a ping phase for identifying the wireless power receiver.

In addition, the reference peak frequency may have a maximum quality factor value within an available frequency band in a state in which only the wireless power receiver is placed in the charging area.

In addition, the foreign object detection method may further include ending power transfer to the wireless power receiver and entering selection phase upon determining that the foreign object is detected.

In addition, the foreign object detection method may further include outputting a predetermined warning alarm indicating that the foreign object has been detected after ending power transfer.

In addition, the foreign object detection status packet may further include mode information, and the reference peak frequency included in the foreign object detection status packet may be identified based on the mode information.

A foreign object detection method of a wireless power transmitter according to another embodiment may include searching for a current peak frequency having a maximum quality factor value within an available frequency band when an object placed in a charging area is detected, collecting statistical data of a communication error count, determining a foreign object detection reference frequency based on a reference peak frequency when a foreign object detection status packet including the reference peak frequency is received from a wireless power receiver, comparing the current peak frequency with the foreign object detection reference frequency, determining whether the communication error count exceeds a predetermined communication error reference value when the current peak frequency is greater than the foreign object detection reference frequency as the result of comparison, and determining that a foreign object is present upon determining that the communication error count exceeds the predetermined communication error reference value.

Here, the statistical data of the communication error count may be collected in at least one of a ping phase or an identification and configuration phase.

In addition, the communication error count may be calculated based on at least one of the number of reception failures of a response signal to a power signal transmitted to identify a wireless power receiver in the ping phase and the number of reception failures of an identification packet and a configuration packet in the identification and configuration phase.

Here, the determining of the foreign object detection reference frequency may include determining a tolerance and determining the foreign object detection reference frequency by a sum of the reference peak frequency and the tolerance.

For example, the tolerance may be determined based on peak frequency change according to movement of a receiver in the charging area.

In another example, the tolerance may be determined based on peak frequency change according to a difference between types of wireless power transmitters.

In another example, the tolerance may be determined based on the larger value of maximum peak frequency change according to movement of a receiver in the charging area and maximum peak frequency change according to a difference between types of wireless power transmitters.

A foreign object detection apparatus for detecting a foreign object placed in a charging area according to an embodiment may include a search unit configured to search for a current peak frequency having a maximum quality factor value within an available frequency band when an object placed in a charging area is detected, a communication unit configured to receive a foreign object detection status packet including a reference peak frequency from a wireless power receiver, a determination unit configured to determine a foreign object detection reference frequency based on the reference peak frequency, and a detection unit configured to compare the current peak frequency with the foreign object detection reference frequency to detect a foreign object.

Here, the determination unit may determine the foreign object detection reference frequency by a sum of the reference peak frequency and a tolerance.

For example, the tolerance may be determined based on peak frequency change according to movement of a receiver in the charging area.

In another example, the tolerance may be determined based on peak frequency change according to a difference between types of wireless power transmitters.

In another example, the tolerance may be determined based on the larger value of maximum peak frequency change according to movement of a receiver in the charging area and maximum peak frequency change according to a difference between types of wireless power transmitters.

In addition, when the current peak frequency is greater than the foreign object detection reference frequency, the detection unit may determine that the foreign object is present.

In addition, the search unit may search for the current peak frequency after power transfer is temporarily stopped before entering a ping phase for identifying the wireless power receiver.

In addition, the reference peak frequency may have a maximum quality factor value within an available frequency band in a state in which only the wireless power receiver is placed in the charging area.

In addition, the foreign object detection apparatus may further include an alarm unit configured to output a predetermined warning alarm indicating that the foreign object has been detected when the foreign object is detected by the detection unit.

A foreign object detection apparatus for detecting a foreign object placed in a charging area according to another embodiment may include a search unit configured to search for a current peak frequency having a maximum quality factor value within an available frequency band when an object placed in a charging area is detected, a communication unit configured to receive a packet from a wireless power receiver, a controller configured to monitor a reception status of the packet to collect statistical data of a communication error count, and a determination unit configured to determine a foreign object detection reference frequency based on a reference peak frequency when a foreign object detection status packet including the reference peak frequency is received, comparing the current peak frequency with the foreign object detection reference frequency. The controller may determine a foreign object is present, when the current peak frequency is greater than the foreign object detection reference frequency and the communication error count exceeds a predetermined communication error reference value.

The control unit or controller 1180 according to an embodiment may be integrated with the communication unit 1160. If the wireless power transmitter and the wireless power receiver perform in-band communication, the controller 1180 may demodulate a signal using current or a voltage of the coil unit 1130.

A foreign object detection apparatus according to an embodiment includes a coil unit including an inductor and a resonant capacitor and configured to convert current into flux of magnetic force, an inverter configured to receive and convert direct current (DC) power into alternating current (AC) power and to transmit the AC power to the coil unit, and a controller configured to control a frequency of the AC power output from the inverter and to demodulate a signal using a voltage or current of the coil unit. The controller may be configured to detect an object placed in the charging area to measure a peak frequency having a maximum quality factor value, to receive a foreign object detection status packet including a reference peak frequency from a wireless power receiver, to determine a frequency for detecting a foreign object based on the reference peak frequency, and to compare the peak frequency with the determined frequency to determine whether a foreign object is present.

In addition, the controller may determine the frequency for detecting the foreign object by a sum of the reference peak frequency and a tolerance.

The controller may measure the peak frequency before the wireless power receiver receives a ping signal.

The reference peak frequency may correspond to a maximum quality factor value within an available frequency band in a state in which only the wireless power receiver is placed in the charging area.

Another embodiment provides a computer-readable recording medium having recorded thereon a program for performing any one of the foreign object detection methods.

The aspects of the disclosure are only a part of the preferred embodiments of the disclosure, and various embodiments based on technical features of the disclosure may be devised and understood by the person having ordinary skill in the art based on the detailed description of the disclosure.

Advantageous Effects

The effects of the method, apparatus and system according to embodiments are as follows.

Embodiments have an advantage of providing a method of detecting a foreign object for wireless charging and an apparatus and system therefor.

Embodiments have an advantage of providing a method of detecting a foreign object, which is capable of more accurately detecting a foreign object and an apparatus and system therefor.

Embodiments have an advantage of providing a wireless power transmitter capable of minimizing unnecessary power waste and a heating phenomenon due to a foreign object.

Embodiments have an advantage of providing a foreign object detection method capable of more accurately detecting a foreign object, by comparing a current peak frequency with a foreign object reference frequency (frequency boundary value) determined based on a reference peak frequency and an apparatus therefor.

Embodiments have an advantage of providing a foreign object detection method capable of more accurately detecting a foreign object, by determining whether a foreign object is present based on statistical data of a communication error count as well as peak frequency change and an apparatus therefor.

Embodiments have an advantage of accurately detecting a foreign object regardless of movement of a receiver in a charging area and the type of a transmitter.

The effects of the disclosure are not limited to the above-described effects and other effects which are not described herein may be derived by those skilled in the art from the following description of the embodiments of the disclosure. That is, effects which are not intended by the disclosure may be derived by those skilled in the art from the embodiments of the disclosure.

DESCRIPTION OF DRAWINGS

FIG. 5 is a diagram illustrating types of packets according to an embodiment.

FIG. 10 is a view illustrating a foreign object detection status packet message according to an embodiment.

FIG. 14 is an experimental result table illustrating a peak frequency of each receiver type and change in peak frequency according to placement of a foreign object according to an embodiment.

BEST MODE

Figure 1:
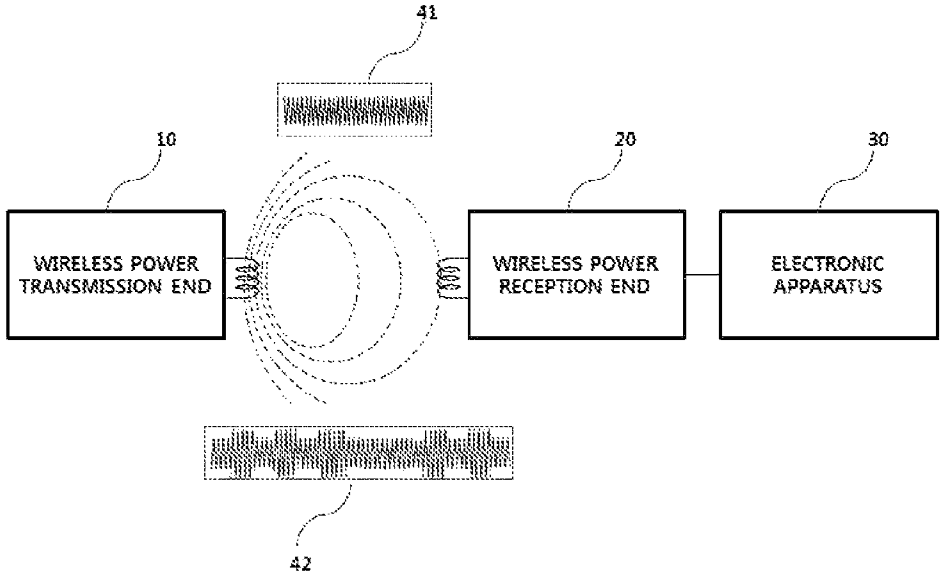
FIG. 1 is a block diagram illustrating a wireless charging system according to an embodiment.

A foreign object detection method of a wireless power transmitter according to an embodiment may include searching for a current peak frequency having a maximum quality factor value within an available frequency band when an object placed in a charging area is detected, receiving a foreign object detection status packet including a reference peak frequency from a wireless power receiver, determining a foreign object detection reference frequency based on the reference peak frequency, and comparing the current peak frequency with the foreign object detection reference frequency to determine whether a foreign object is present.

MODE FOR INVENTION

Hereinafter, apparatuses and various methods according to embodiments will be described in detail with reference to the accompanying drawings. In general, a suffix such as "module" or "unit" may be used to refer to elements or components. Use of such a suffix herein is merely intended to facilitate description of the specification, and the suffix itself is not intended to have any special meaning or function.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the description of embodiments, an apparatus having a function for transmitting wireless power in a wireless charging system may be used interchangeably with a wireless power transmitter, a wireless power transfer apparatus, a wireless electric power transfer apparatus, a wireless electric power transmitter, a transmission end, a transmitter, a transmission apparatus, a transmission side, a wireless power transfer apparatus, a wireless power transferer, etc., for convenience of description. An apparatus having a function for receiving wireless power from a wireless power transfer apparatus may be used interchangeably with a wireless electric power reception apparatus, a wireless electric power receiver, a wireless power reception apparatus, a wireless power receiver, a reception terminal, a reception side, a reception apparatus, a receiver, etc.

The transmitter according to embodiment may be configured in the form of a pad, a cradle, an access point (AP), a small base station, a stand, a ceiling embedded structure or a wall-mounted structure. One transmitter may transfer power to a plurality of wireless power reception apparatuses. To this end, the transmitter may include at least one wireless power transfer means. Here, the wireless power transfer means may use various wireless power transfer standards based on an electromagnetic induction method of performing charging using the electromagnetic induction principle in which a magnetic field is generated in a power transfer-end coil and electricity is induced in a reception-end coil by the magnetic field. Here, the wireless power transfer means may include wireless charging technology of the electromagnetic induction method defined in the Wireless Power Consortium (WPC) and Power Matters Alliance (PMA) which are the wireless charging technology organizations.

In addition, a receiver according to an embodiment may include at least one wireless power reception means and may simultaneously receive wireless power from two or more transmitters. Here, the wireless power reception means may include wireless charging technology of the electromagnetic induction method defined in the Wireless Power Consortium (WPC) and Power Matters Alliance (PMA) which are the wireless charging technology organizations.

The receiver according to the embodiment may be used in a small electronic apparatus such as a mobile phone, a smartphone, a laptop, a digital broadcast terminal, a personal digital assistant (PDA), a portable multimedia player (PMP), a navigation system, an MP3 player, an electric toothbrush, an electronic tag, a lighting device, a remote controller, a fishing float, a wearable device such as a smart watch, etc. without being limited thereto, and may be used in any apparatus including wireless power reception means according to embodiment to charge a battery.

FIG. 1 is a block diagram illustrating a wireless charging system according to an embodiment.

Referring to FIG. 1, the wireless charging system roughly includes a wireless power transfer end 10 for wirelessly transmitting power, a wireless power reception end 20 for receiving the transmitted power and an electronic apparatus 30 for receiving the received power.

For example, the wireless power transfer end 10 and the wireless power reception end 20 may perform in-band communication in which information is exchanged using the same frequency band as the operating frequency used for wireless power transfer.

In in-band communication, when a power signal 41 transmitted by the wireless power transfer end 10 is received by the wireless power reception end 20, the wireless power reception end 20 may modulate the received power signal and transmit a modulated signal 42 to the wireless power transfer end 10.

In another example, the wireless power transfer end 10 and the wireless power reception end 20 may perform out-of-band communication in which information is exchanged using the frequency band different from the operating frequency used for wireless power transfer.

For example, the information exchanged between the wireless power transfer end 10 and the wireless power reception end 20 may include status information of each other and control information. Here, the status information and the control information exchanged between the transmission end and the reception end will become more apparent through the following description of the embodiments.

In-band communication and out-of-communication may provide bidirectional communication, but the embodiments are not limited thereto. In another embodiment, in-band communication and out-of-communication may provide a unidirectional communication or half duplex communication.

For example, unidirectional communication may, but is not limited to, mean transmission of information from the wireless power reception end 20 to the wireless power transfer end 10 or transmission from the wireless power transfer end 10 to the wireless power reception end 20.

The half duplex communication method is characterized in that bidirectional communication between the wireless power reception end 20 and the wireless power transfer end 10 is enabled but information can be transmitted only by one device at a certain point in time.

The wireless power reception end 20 according to the embodiment may acquire a variety of status information of the electronic apparatus 30. For example, the status information of the electronic apparatus 30 may include, but is not limited to, current power usage information, current power usage information, information for identifying an executed application, CPU usage information, battery charge status information, battery output voltage/current information, etc. and may include information capable of being acquired from the electronic apparatus 30 and being used for wireless power control.

In particular, the wireless power transfer end 10 according to the embodiment may transmit a predetermined packet indicating whether fast charging is supported to the wireless power reception end 20. The wireless power reception end 20 may inform the electronic apparatus 30 that the wireless power transfer end 10 supports the fast charging mode, upon determining that the wireless power transfer end 10 supports the fast charging mode. The electronic apparatus 30 may display information indicating that fast charging is possible through a predetermined display means, for example, a liquid crystal display.

Figure 2:
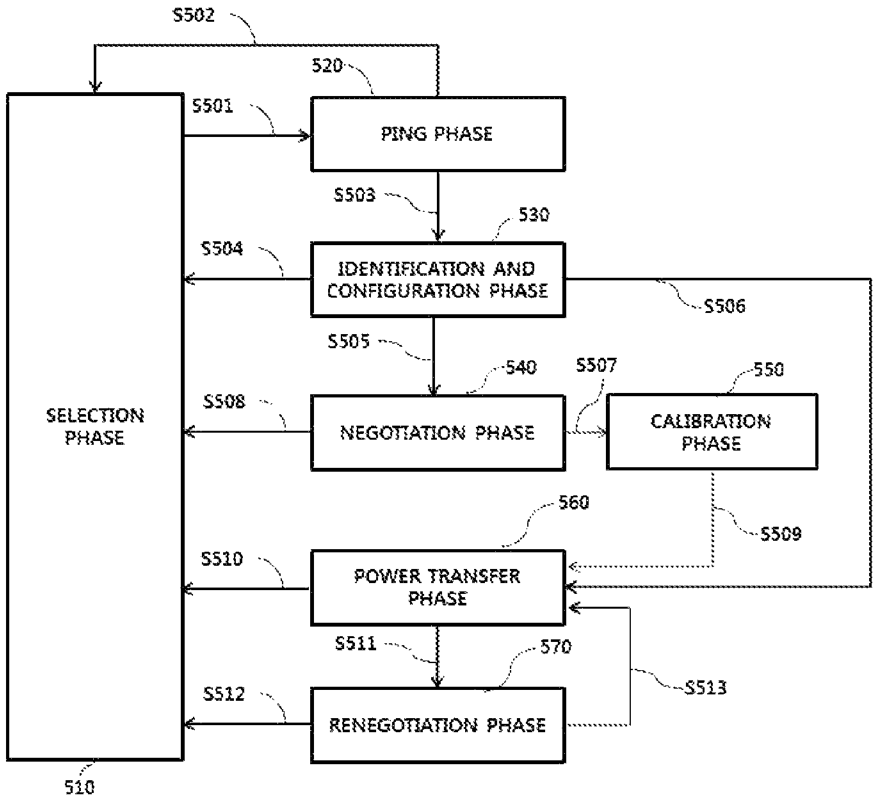
FIG. 2 is a state transition diagram explaining a wireless power transfer procedure according to an embodiment.

FIG. 2 is a state transition diagram explaining a wireless power transfer procedure.

Referring to FIG. 2, power transfer from the transmitter to the receiver according to the embodiment may be broadly divided into a selection phase 510, a ping phase 520, an identification and configuration phase 530, a negotiation phase 540, a calibration phase 550, a power transfer phase 560 and a renegotiation phase 570.

The selection phase 510 may transition when power transfer starts or when a specific error or a specific event is sensed while power transfer is maintained (for example, including reference numerals S502, S504, S508, S510 and S512). The specific error and the specific event will become apparent from the following description. In addition, in the selection phase 510, the transmitter may monitor whether an object is present on an interface surface. Upon detecting that the object is present on the interface surface, the transmitter may transition to the ping phase 520. In the selection phase 510, the transmitter may transmit an analog ping signal having a very short pulse and detect whether an object is present in an active area of the interface surface based on change in current of a transmission coil or a primary coil.

If the object is detected in the selection phase 510, the wireless power transmitter may measure the quality factor of a wireless power resonant circuit (e.g., a power transfer coil and/or a resonant capacitor).

In one embodiment, when the object is detected in the selection phase 510, the quality factor may be measured in order to determine whether the wireless power receiver is placed in the charging area along with a foreign object.

The coil provided in the wireless power transmitter has an inductance and/or a series resistance component in the coil which may decrease due to environmental change, thereby decreasing the quality factor value. In order to determine whether the foreign object is present using the measured quality factor value, the wireless power transmitter may receive, from the wireless power receiver, a reference quality factor value previously measured in a state in which a foreign object is not placed in the charging area.

The reference quality factor value received in the negotiation phase 540 may be compared with the measured quality factor value, thereby determining whether the foreign object is present. However, in the case of a wireless power receiver having a low reference quality factor (for example, a specific wireless receiver may have a low reference quality factor value according to the type, usage and characteristics of the wireless power receiver), since a difference between the quality factor value measured when the foreign object is present and the reference quality factor is small, it is difficult to determine whether a foreign object is present. Accordingly, it is necessary to further consider other determination elements or to determine whether a foreign object is present using other methods.

In another embodiment, when the object is detected in the selection phase 510, the quality factor value within a specific frequency region (e.g., an operating frequency region) may be measured in order to determine whether the wireless power receiver is placed in the charging area along with the foreign object. The coil of the wireless power transmitter may have the inductance and/or series resistance component in the coil which may decrease due to environmental change, thereby changing (shifting) the resonant frequency of the coil of the wireless power transmitter. That is, a quality factor peak frequency as a frequency at which the maximum quality factor value is measured in the operating frequency band may be shifted.

For example, since the wireless power receiver includes a magnetic shield (shielding material) having high permeability, the high permeability may increase the inductance value measured in the coil of the wireless power transmitter. In contrast, a foreign object, which is a metallic material, decreases the inductance value.

FIG. 18 is a graph showing change in quality factor value measured when the wireless power receiver or the foreign object is placed in the charging area in the case where the resonant frequency of the coil of the wireless power transmitter according to an embodiment is 100 kHz.

Generally, in the case of an LC resonant circuit, the resonant frequency f_resonant is calculated by $1/2\pi\sqrt{LC}$.

Referring to the left graph of FIG. 18, when only the wireless power receiver is placed in the charging area, since the L value increases, the resonant frequency decreases to be moved (shifted) to the left on the frequency axis.

Referring to the right graph of FIG. 18, when a foreign object is placed in the charging area, since the L value decreases, the resonant frequency increases to be moved (shifted) to the right on the frequency axis.

In order to determine whether a foreign object is present using a frequency at which a maximum quality factor is measured, that is, a measured peak frequency, the wireless power transmitter may receive the reference maximum quality factor frequency pre-measured in a state in which the foreign object is not placed in the charging area, that is, the reference peak frequency, from the wireless power receiver. The received reference peak frequency value may be compared with the measured peak frequency value in the negotiation phase 540, thereby determining whether a foreign object is present.

The foreign object detection through peak frequency comparison may be used along with a method of comparing quality factor values. If a difference between the reference quality factor value and the measured quality factor value is small, for example, if the difference is equal to or less than 10%, presence of the foreign object may be determined by comparing the reference peak frequency with the measured peak frequency. In contrast, if the difference between the quality factors exceeds 10%, the wireless power transmitter may immediately determine that the foreign object is present.

In another example, upon determining that the foreign object is not present as the result of comparing the reference quality factor value with the measured quality factor value, the reference peak frequency may be compared with the measured peak frequency to determine whether a foreign object is present. If it is difficult to detect the foreign object using the quality factor, the wireless power receiver may include information on the reference peak frequency in a foreign object detection status packet and transmit the packet to the wireless power transmitter, and the wireless power transmitter may detect the foreign object further using information on the reference peak frequency, thereby improving foreign object detection capability.

In the ping phase 520, when the object is sensed, the transmitter wakes up the receiver and transmits a digital ping for identifying whether the detected object is a wireless power receiver. In the ping phase 520, when a response signal to the digital ping, for example, a signal strength packet, is not received from the receiver, the transmitter may transition to the selection phase 510 again. In addition, in the ping phase 520, when a signal indicating that power transfer has been terminated, that is, a charging termination packet, is received from the receiver, the transmitter may transition to the selection phase 510.

If the ping phase 520 is terminated, the transmitter may transition to the identification and configuration phase 530 for identifying the receiver and collecting the configuration and status information of the receiver.

In the identification and configuration phase 530, when an unexpected packet is received, when an expected packet is not received during a predetermined time (timeout), when a packet transmission error occurs, or when power transfer contract is not established (no power transfer contract), the transmitter may transition to the selection phase 510.

The transmitter may determine whether entry into the negotiation phase 540 is necessary based on the negotiation field value of the configuration packet received in the identification and configuration phase 530.

Upon determining that negotiation is necessary, the transmitter may transition to the negotiation phase 540 to perform a predetermined FOD procedure.

In contrast, upon determining that negotiation is not necessary, the transmitter may immediately transition to the power transfer phase 560.

In the negotiation phase 540, the transmitter may receive a foreign object detection (FOD) status packet including a reference quality factor value. Alternatively, an FOD status packet including a reference peak frequency value may be received. Alternatively, a status packet including a reference quality factor value and a reference peak frequency value may be received. At this time, the transmitter may determine a quality factor threshold value for FO detection based on the reference quality factor value.

Alternatively, the transmitter may determine a peak frequency threshold value for FO detection based on the reference peak frequency value. The transmitter may detect whether an FO is present in the charging area using the quality factor threshold value for FO detection and a currently measured quality factor value (a quality factor value measured before the ping phase) and control power transfer according to the result of FO detection. For example, when the FO is detected, a negative acknowledgement signal may be transmitted to the wireless power receiver in response to the FOD status packet. Therefore, power transfer may be stopped, without being limited thereto.

The transmitter may detect whether an FO is present in the charging area using the peak frequency threshold value for FO detection and a currently measured quality factor value (a quality factor value measured before the ping phase) and control power transfer according to the result of FO detection. For example, when the FO is detected, a negative acknowledgement signal may be transmitted to the wireless power receiver in response to the FOD status packet. Therefore, power transfer may be stopped, without being limited thereto.

When the FO is detected, the transmitter may return to the selection phase 510 when the receiver transmits an end-of-charge message. In contrast, when the FO is not detected, the transmitter may end transmit power negotiation and enter the power transfer phase 560 through the calibration phase 550. Specifically, when the FO is not detected, the transmitter may measure power loss at the reception end and the transmission end, in order to determine the strength of the power received by the reception end and to determine the strength of the power transmitted by the transmission end in the calibration phase 550. That is, the transmitter may predict power loss based on a difference between the transmission power of the transmission end and the reception power of the reception end in the calibration phase 550. The transmitter according to one embodiment may calibrate the threshold value for FO detection using the predicted power loss.

In the power transfer phase 560, when an unexpected packet is received, when an expected packet is not received during a predetermined time (timeout), when power transfer contract violation occurs or when charging is terminated, the transmitter may transition to the selection phase 510.

In addition, in the power transfer phase 560, if a power transfer contract needs to be reconfigured according to transmitter status change, etc., the transmitter may transition to the renegotiation phase 570. At this time, when renegotiation is normally terminated, the transmitter may return to the power transfer phase 560.

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 3:
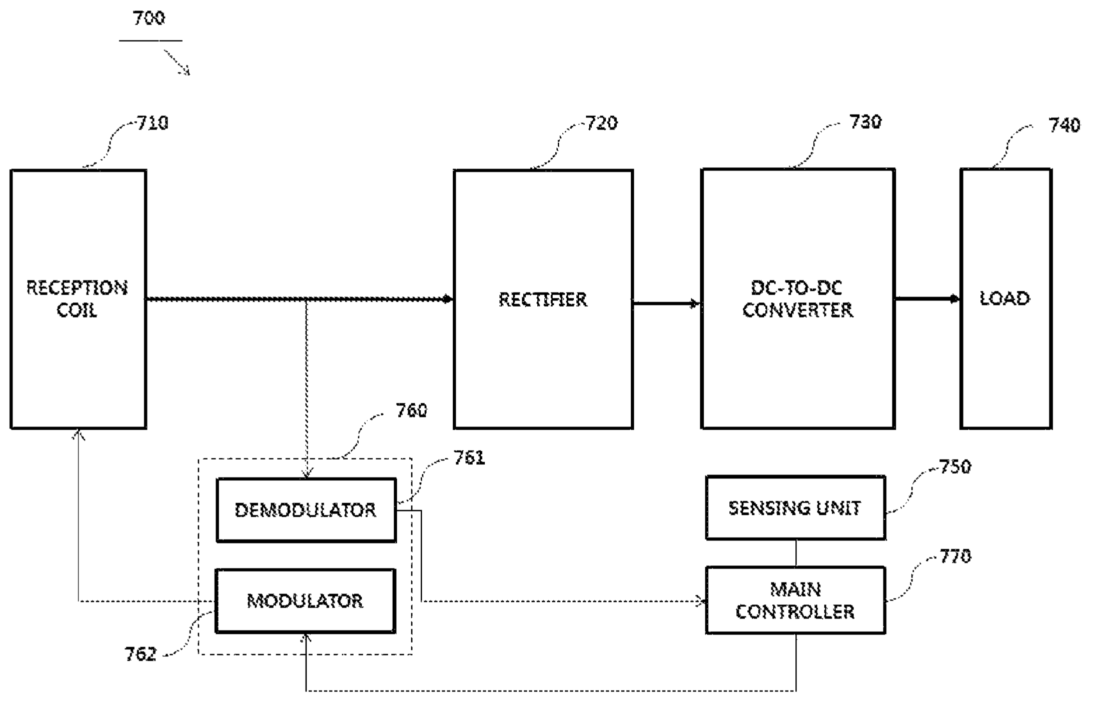
FIG. 3 is a block diagram illustrating the structure of a wireless power receiver according to an embodiment.

FIG. 3 is a block diagram illustrating the structure of a wireless power receiver according to an embodiment.

Referring to FIG. 3, the wireless power receiver 700 may include a reception coil 710, a rectifier 720, a DC-to-DC converter 730, a load 740, a sensing unit 750, a communication unit 760, and a main controller 770. The communication unit 760 may include a demodulator 761 and a modulator 762.

Although the wireless power receiver 700 shown in the example of FIG. 3 is shown as exchanging information with the wireless power transmitter 600 through in-band communication, this is merely an embodiment and the communication unit 760 according to another embodiment may provide short-range bidirectional communication through a frequency band different from a frequency band used to transmit a wireless power signal.

AC power received through the reception coil 710 may be transmitted to the rectifier 720. The rectifier 720 may convert the AC power into DC power and transmit the DC power to the DC-to-DC converter 730. The DC-to-DC converter 730 may convert the strength of the DC power output from the rectifier into a specific strength required by the load 740 and transmit the converted power to the load 740.

The sensing unit 750 may measure the strength of the DC power output from the rectifier 720 and provide the strength to the main controller 770. In addition, the sensing unit 750 may measure the strength of current applied to the reception coil 710 according to wireless power reception and transmit the measured result to the main controller 770. In addition, the sensing unit 750 may measure the internal temperature of the wireless power receiver 700 and provide the measured temperature value to the main controller 770.

For example, the main controller 770 may compare the strength of the DC power output from the rectifier with a predetermined reference value and determine whether overvoltage occurs. Upon determining that overvoltage occurs, a predetermined packet indicating that overvoltage has occurred may be generated and transmitted to the modulator 762. The signal modulated by the modulator 762 may be transmitted to the wireless power transmitter 600 through the reception coil 710 or a separate coil (not shown).

For example, the main controller 770 may generate and transmit the FOD status packet to the modulator 762 in the negotiation phase 540 of FIG. 2. Here, the signal modulated by the modulator 762 may be transmitted to the wireless power transmitter 600 through the reception coil 710 or a separate coil (not shown).

If the strength of the DC power output from the rectifier is equal to or greater than the predetermined reference value, the main controller 770 may determine that a sensing signal is received and perform control to transmit a signal strength indicator corresponding to the sensing signal to the wireless power transmitter 600 through the modulator 762 upon receiving the sensing signal. In another example, the demodulator 761 may demodulate the AC power signal between the reception coil 710 and the rectifier 720 or the DC power signal output from the rectifier 720, identify whether a sensing signal is received, and provide the identified result to the main controller 770. At this time, the main controller 770 may perform control to transmit the signal strength indicator corresponding to the sensing signal through the modulator 762.

Figure 4:
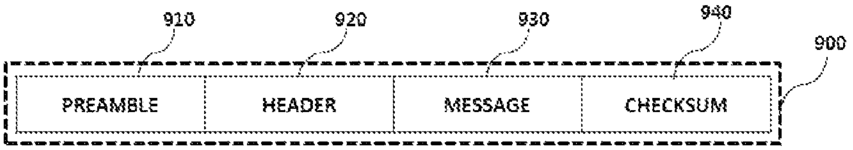
FIG. 4 is a diagram illustrating a packet format according to an embodiment.

FIG. 4 is a view illustrating a packet format according to an embodiment.

Referring to FIG. 4, the packet format 900 used for information exchange between the wireless power transfer end 10 and the wireless power reception end 20 may include a preamble 910 field for acquiring synchronization for demodulation of the corresponding packet and identifying an accurate start bit of the corresponding packet, a header 920 field for identifying the type of a message included in the corresponding packet, a message 930 field for transmitting the content (or payload) of the corresponding packet, and a checksum 940 field for identifying whether an error has occurred in the corresponding packet.

A packet reception end may identify the size of the message 930 included in the corresponding packet based on the value of the header 920.

In addition, the header 920 may be defined for each step of the wireless power transfer procedure, and the value of the header 920 may be defined as the same value in different phases of the wireless power transmission procedure. For example, referring to FIG. 6, it should be noted that the header value corresponding to end power transfer of the ping phase and end power transfer of the power transfer phase is 0x02.

The message 930 includes data to be transmitted by the transmission end of the corresponding packet. For example, the data included in the message 930 field may be a report, a request, or a response, without being limited thereto.

The packet 900 according to another embodiment may further include at least one of transmission end identification information for identifying the transmission end for transmitting the corresponding packet and reception end identification information for identifying the reception end for receiving the corresponding packet. The transmission end identification information and the reception end identification may include IP address information, MAC address information, product identification information, etc. However, the embodiment is not limited thereto and information for distinguishing the reception end and the transmission end in the wireless charging system may be included.

The packet 900 according to another embodiment may further include predetermined group identification information for identifying a reception group if the corresponding packet is received by a plurality of apparatuses.

FIG. 5 is a view illustrating the types of packets transmitted from the wireless power receiver to the wireless power transmitter according to an embodiment.

Referring to FIG. 5, the packet transmitted from the wireless power receiver to the wireless power transmitter may include a signal strength packet for transmitting the strength information of a sensed ping signal, a power transfer type (end power transfer) for requesting power transfer end from the transmitter, a power control hold-off packet for transferring information on a time until actual power is controlled after a control error packet for control is received, a configuration packet for transferring configuration information of the receiver, an identification packet and an extended identification packet for transmitting receiver identification information, a general request packet for transmitting a general request message, a specific request packet for transmitting a specific request message, an FOD status packet for transmitting a reference quality factor value and/or a reference peak frequency value for FO detection, a control error packet for controlling power transmitted by the transmitter, a renegotiation packet for starting renegotiation, a 24-bit received power packet for transmitting the strength information of the received power, and a charge status packet for transmitting the current charging status information of the load.

The packets transmitted from the wireless power receiver to the wireless power transmitter may be transmitted using in-band communication using the same frequency band as the frequency band used to transmit wireless power.

Figure 6:
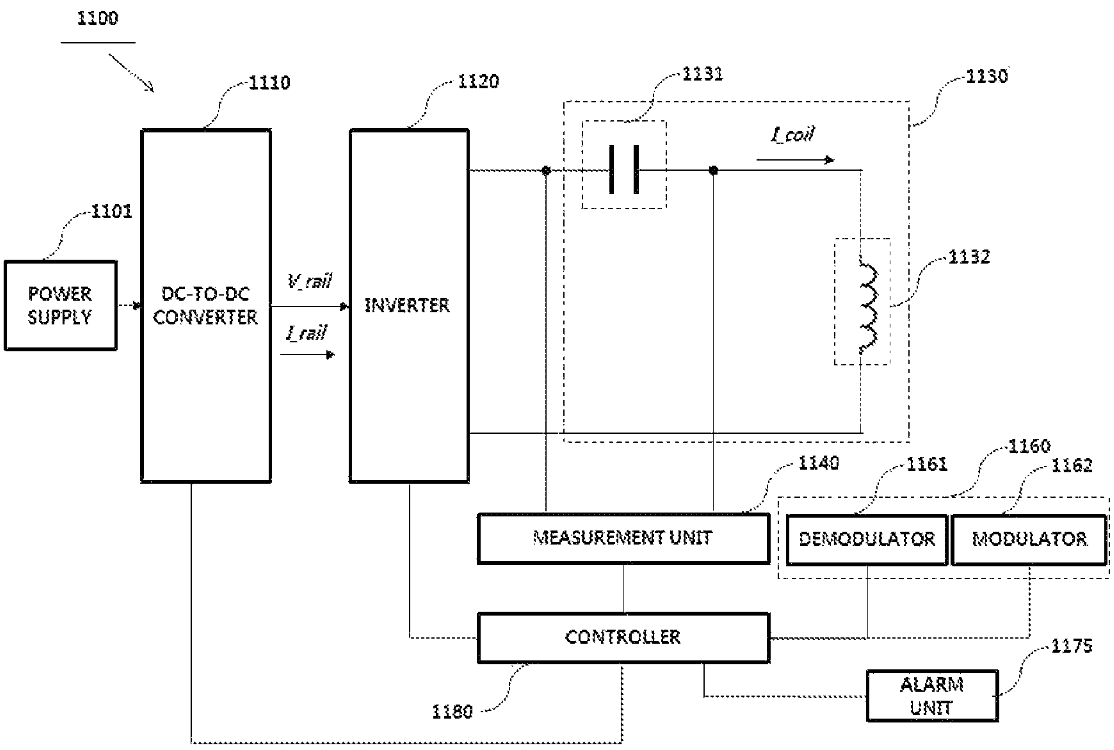
FIG. 6 is a block diagram illustrating the configuration of a foreign object detection apparatus according to an embodiment.

Referring to FIG. 6, the wireless power transmitter 1100 may include a power supply 1101, a DC-to-DC converter 1110, an inverter 1120, a resonant circuit or a coil unit 1130, a measurement unit 1140, a communication unit 1160, an alarm unit 1175, and a control unit or controller 1180.

The wireless power transmitter 1100 according to the present embodiment may be mounted in a measurement apparatus for authentication of a wireless power reception apparatus or a wireless power transmission apparatus.

The resonant circuit 1130 may include a resonant capacitor 1131 and an inductor (or a transmission coil) 1132 to convert current into flux of magnetic force.

The communication unit 1160 may include at least one of a demodulator 1161 and a modulator 1162.

The controller 1180 may perform in-band communication or out-of-band communication with the wireless power receiver through the communication unit 1160.

The power supply 1101 may receive DC power through an external power terminal or a battery and transmit the DC power to the DC-to-DC converter 1110. Here, the battery may be mounted in the wireless power transmitter 110 and may be charged but is merely an embodiment. The battery may be connected to a predetermined cable of the power supply 1101 of the wireless power transmitter 1100 in the form of an auxiliary battery or an external battery.

The DC-to-DC converter 1110 may convert the strength of the DC power received from the power supply 1101 into a specific strength of DC power under control of the controller 1180. For example, the DC-to-DC converter 1110 may include a variable voltage generator capable of adjusting the strength of the voltage, without being limited thereto.

The inverter 1120 may convert the converted DC power into AC power. The inverter 1120 may convert the DC power signal input through control of a plurality of switches into an AC power signal and output the AC power signal.

For example, the inverter 1120 may include a full bridge circuit. However, the embodiment is not limited thereto and the inverter may include a half bridge circuit.

In another example, the inverter 1120 may include a half bridge circuit and a full bridge circuit. In this case, the controller 1180 may dynamically determine whether the inverter 1120 operates as a half bridge or a full bridge.

The wireless power transmission apparatus according to one embodiment may adaptively control the bridge mode of the inverter 1120 according to the strength of the power required by the wireless power reception apparatus.

Here, the bridge mode includes a half bridge mode and a full bridge mode.

For example, if the wireless power reception apparatus requests low power of 5 W, the controller 1180 may perform control such that the inverter 1120 is driven in the half bridge mode.

In contrast, if the wireless power reception apparatus requests high power of 15 W, the controller 1180 may perform control such that the inverter is driven in the full bridge mode.

In another example, the wireless power transmission apparatus may adaptively determine the bridge mode according to a sensed temperature and drive the inverter 1120 in the determined bridge mode.

For example, if the temperature of the wireless power transmission apparatus exceeds a predetermined reference value while wireless power is transmitted using the half bridge mode, the controller 1180 may perform control to deactivate the half bridge mode and activate the full bridge mode. That is, the wireless power transmitter 1100 may increase the voltage and decrease the strength of current flowing in the resonant circuit 1130 through the full bridge circuit for transmission of power having the same strength, thereby maintaining the internal temperature of the wireless power transmission apparatus at a reference value or less. In general, the amount of heat generated in an electronic part mounted in the electronic apparatus may be more sensitive to the strength of current than the strength of the voltage applied to the electronic part.

In addition, the inverter 1120 may not only convert the DC power into AC power but also change the strength of the AC power.

For example, the inverter 1120 may adjust the strength of the output AC power by adjusting the frequency of a reference alternating current signal used to generate the AC power under control of the controller 1180. To this end, the inverter 1120 may include a frequency oscillator for generating the reference alternating current signal having a specific frequency. However, this is merely an example and the frequency oscillator may be mounted independently of the inverter 1120 and mounted at one side of the wireless power transmitter 1100.

In another example, the wireless power transmitter 1100 may further include a gate driver (not shown) for controlling the switch provided in the inverter 1120. In this case, the gate driver may receive at least one pulse width modulation signal from the controller 1180 and control the switch of the inverter 1120 according to the received pulse width modulation signal. The controller 1180 may control the duty cycle, that is, the duty rate, and phase of the pulse width modulation signal to control the strength of the output power of the inverter 1120. The controller 1180 may adaptively control the duty cycle and phase of the pulse width modulation signal based on the feedback signal received from the wireless power reception apparatus.

The measurement unit 1140 may measure at least one of a voltage, current and impedance of the resonant capacitor 1131 according to the control signal of the controller 1180 to calculate the quality factor value of the resonant circuit 1130. At this time, the calculated quality factor value may be transmitted to the controller 1180, and the controller 1180 may store the quality factor value received from the measurement unit 1140 in a predetermined recording region.

Alternatively, the measurement unit 1140 may measure a voltage across the resonant capacitor 1131 to measure a resonant frequency value. At this time, the resonant frequency may mean a frequency having a maximum quality factor value. At this time, the calculated resonant frequency value may be transmitted to the controller 1180 and the controller 1180 may store the resonant frequency value received from the measurement unit 1140 in a predetermined recording region.

In addition, the measurement unit 1140 may measure the quality factor value within the available frequency band in certain frequency units and transmit the result of measurement to the controller 1180, under control of the controller 1180.

In addition, the measurement unit 1140 may detect current I_coil flowing in the coil unit and a voltage applied to the coil unit and provide the current and the voltage to the controller 1180. At this time, the controller 1180 may demodulate the signal based on the voltage or current received from the measurement unit 1140.

For example, when an object is detected in the selection phase, the controller 1180 may temporarily stop power transfer and request, from the measurement unit 1140, measurement of the quality factor values at a plurality of frequencies within the operating frequency band before entering the ping phase. The controller 1180 may identify a frequency corresponding to a largest value among the measured quality factor values and determine the identified frequency as a current peak frequency.

When the FOD status packet is received from the demodulator 1161 in the negotiation phase, the controller 1180 may determine a threshold value (or a threshold range) for determining whether a foreign object is present based on information included in the FOD status packet. Here, the method of determining the threshold value (or the threshold range) will become more apparent through the description of the following drawings.

The FOD status packet may include at least one of a reference quality factor value Q_reference corresponding to the wireless power receiver and/or a reference peak frequency F_reference_peak value.

The controller 1180 may determine a foreign object detection reference frequency based on the received reference peak frequency value.

The controller 1180 may compare the determined foreign object detection reference frequency with a current peak frequency to detect a foreign object.

For example, when the current peak frequency value is greater than the foreign object detection reference frequency value, the controller 1180 may determine that a foreign object is present in the charging area.

The frequency value comparison of the above-described embodiments may be performed after conversion into a value corrected in consideration of an error range or the manufacturing characteristics of a wireless power transmitter.

As shown in the experimental results of the following drawings, the peak frequency having a maximum quality factor value when a foreign object is placed in the charging area is greater than the peak frequency before the foreign object is placed.

In addition, as shown in the experimental results of the following drawings, it can be seen that the peak frequency may be changed according to a position of the wireless power receiver placed in the charging area.

Accordingly, when the reference peak frequency received from the wireless power receiver is determined as the foreign object detection reference frequency, the foreign object detection apparatus 1200 may mis-determine peak frequency change according to receiver position change as peak frequency change due to a foreign object placed in the charging area. In order to solve this, the foreign object detection reference frequency according to an embodiment may be determined by applying a predetermined tolerance value corresponding to peak frequency change according to receiver movement to the reference peak frequency value. For example, if the tolerance value is 5 kHz, the foreign object detection reference peak frequency may be set to a value obtained by adding 5 kHz to the reference peak frequency.

Accordingly, the controller 1180 may determine whether the current peak frequency value is greater or less than the foreign object detection reference frequency value and determine whether the current peak frequency is changed from the reference peak frequency due to movement of the receiver.

When the controller 1180 determines that the foreign object is present, the wireless power transmitter may transmit a negative acknowledgement signal to the wireless power receiver in response to the FOD status packet. Therefore, the wireless power receiver may transmit an end-of-charge message to the wireless power transmitter. The wireless power transmitter may stop power transfer when the end-of-charge message is received. As an additional embodiment, the alarm unit 1175 may be controlled to output a predetermined warning alarm indicating that the foreign object has been detected. For example, the alarm unit 1175 may include a beeper, an LED lamp, a vibration element, and a liquid crystal display, without being limited thereto. Any alarm unit capable of notifying the user of foreign object detection may be used.

The reference quality factor value or the reference peak frequency value included in the FOD status packet may be predetermined through experimentation on a specific wireless power transmitter (or a measurement apparatus) designated for standard performance test and receiver authentication and may be set in the wireless power receiver.

For example, the smallest value of the quality factor values measured in correspondence with the wireless power receiver at a plurality of designated positions in the charging area, for example, a charging pad provided on the wireless power transmitter or the measurement apparatus, may be determined as the reference quality factor value.

For example, the highest value of the peak frequency values measured in correspondence with the wireless power receiver at a plurality of designated positions in the charging area, for example, a charging pad provided on the wireless power transmitter or the measurement apparatus, may be determined as the reference quality factor value.

When the foreign object is detected in the negotiation phase, the controller 1180 may transmit a negative acknowledgement signal to the wireless power receiver in response to the FOD status packet. Therefore, the wireless power receiver may transmit an end-of-charge message to the wireless power transmitter. The wireless power transmitter may stop power transfer and return to the selection phase, when the end-of-charge message is received.

As an additional embodiment, the controller 1180 may perform the foreign object detection procedure again after returning to the selection phase and determine whether the detected foreign object has been removed from the charging area. Upon determining that the foreign object has been removed, the controller 1180 may enter the power transfer phase and perform charging of the wireless power reception apparatus.

In addition, the controller 1180 may monitor whether a response signal, for example, a signal strength packet, is normally received in the ping phase. For example, the controller 1180 may calculate the number of times that the signal strength packet is not normally received after digital ping transmission.

In addition, the controller 1180 may monitor whether the identification and configuration packet is normally received in the identification and configuration phase. For example, the controller 1180 may calculate the number of reception failures of the identification and configuration packet.

Hereinafter, an example of determining reception failure of the identification and configuration packet will be described.

For example, the controller 1180 may determine that reception of the identification and configuration packet has failed when the identification packet is not normally received within a predetermined first time after the signal strength packet is normally received.

In another example, the controller 1180 may determine that reception of the identification and configuration packet has failed when all a series of identification packets is not sequentially received within a predetermined second time after the signal strength packet is normally received.

Hereinafter, for convenience of description, the number of packet reception failures in the ping phase and/or the identification and configuration phase is referred to as a communication error count.

For example, the controller 1180 may determine that a foreign object is present on a wireless power transmission path, when the current peak frequency value is greater than the foreign object detection reference frequency value and the communication error count exceeds a predetermined communication error reference value.

In contrast, the controller 1180 may determine that a foreign object is not present on the wireless power transmission path, when the current peak frequency value is greater than the foreign object detection reference frequency value but the communication error count is equal to or less than the predetermined communication error reference value.

Figure 7:
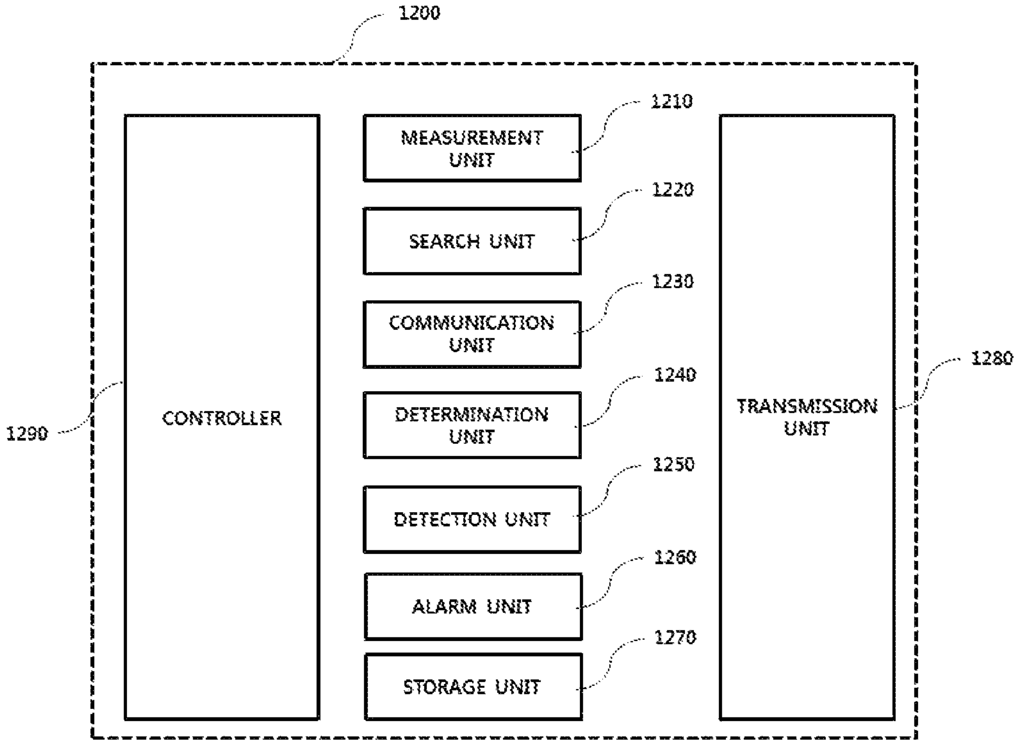
FIG. 7 is a block diagram illustrating the configuration of a foreign object detection apparatus according to another embodiment.

FIG. 7 is a block diagram illustrating the structure of a foreign object detection apparatus according to another embodiment.

Referring to FIG. 7, the foreign object detection apparatus 1200 may include a measurement unit 1210, a search unit 1220, a communication unit 1230, a determination unit 1240, a detection unit 1250, an alarm unit 1260, a storage unit 1270, a transmission unit 1280 and a controller 1290. It should be noted that the components of the foreign object detection apparatus 1200 are not mandatory and more or fewer components may be included.

The transmission unit 1280 may include a DC-to-DC converter, an inverter, and a resonant circuit for wireless power transmission.

Upon detecting an object placed in the charging area in the selection phase, the measurement unit 1210 may temporarily stop power transfer and measure the quality factor value at a predetermined reference operating frequency. Here, the quality factor value may be measured at a plurality of frequencies determined within an available frequency band (or an operating frequency band). For example, the available frequency band may be 88 kHz to 151 kHz, but is merely an embodiment, and may be changed according to the design purposes of those skilled in the art and applied wireless power transmission technology (or standard).

The search unit 1220 may search for a frequency having a maximum quality factor value, that is, a current peak frequency, based on the result of measurement of the measurement unit 1210. The current peak frequency searched by the search unit 1220 may be stored in a predetermined recording region of the storage unit 1270.

Referring to the experimental results of the following drawings, when a foreign object is placed in the charging area along with the wireless power receiver, the peak frequency having a maximum quality factor value may further increase as compared to the case where only the wireless power receiver is placed in the charging area.

The communication unit 1230 may demodulate a wireless signal and acquire various packets transmitted by the wireless power receiver as shown in FIG. 5. For example, the communication unit 1230 may acquire a signal strength packet in the ping phase. In addition, the communication unit 1230 may acquire an identification packet and a configuration packet in the identification and configuration phase. In addition, the communication unit 1230 may acquire a foreign object detection (FOD) status packet in the negotiation phase. In addition, the communication unit 1230 may receive a control error packet for power control, a receive power packet, etc. in the power transfer phase.

For example, the foreign object detection status packet may include at least one of a reference quality factor value Q_reference or a reference peak frequency value F_reference_peak.

The structure of the foreign object detection status packet will become more apparent through the description of FIG. 10.

The determination unit 1240 may determine the foreign object detection reference frequency based on the reference peak frequency value included in the foreign object detection status packet.

For example, the determination unit 1240 may calculate the foreign object detection reference frequency by adding a predetermined first tolerance value based on maximum peak frequency change according to receiver movement to the reference peak frequency value.

In another example, the determination unit 1240 may calculate the foreign object detection reference frequency by adding a predetermined second tolerance value based on maximum peak frequency change according to a difference between wireless power transmitter types to the reference peak frequency value.

In another example, the determination unit 1240 may determine the larger value of the first tolerance value and the second tolerance value as the tolerance value and add the determined tolerance value to the reference peak frequency value to calculate the foreign object detection reference frequency.

The detection unit 1250 may compare the determined foreign object detection reference frequency with the current peak frequency to detect a foreign object placed on the wireless power transmission path.

For example, the detection unit 1250 may determine that a foreign object is present in the charging area when the current peak frequency is greater than the foreign object detection reference frequency (or the boundary value calculated using the reference frequency).

Figure 13:
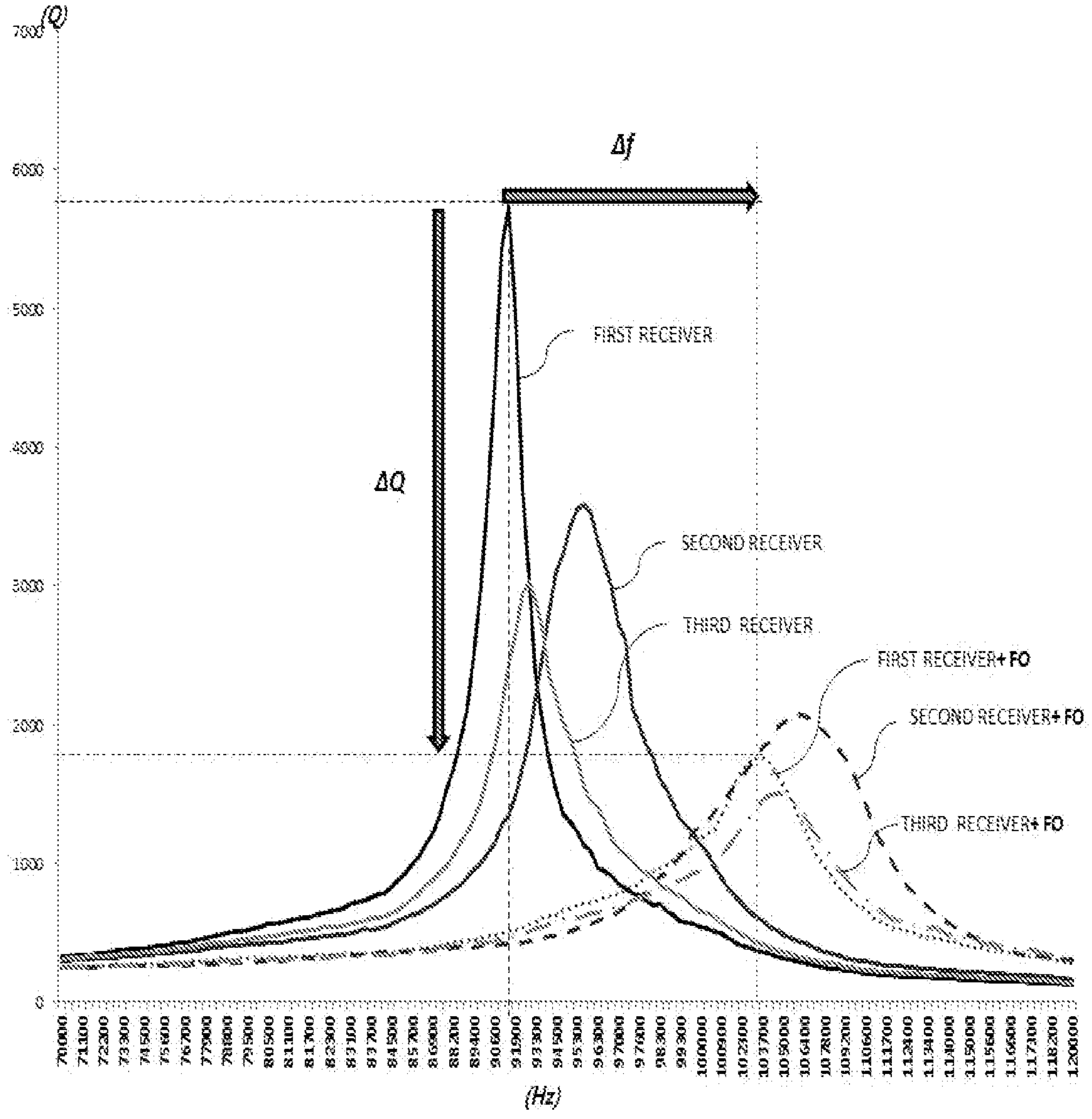
FIG. 13 is an experimental result table illustrating change in quality factor value and peak frequency according to placement of a foreign object in a wireless charging system according to an embodiment.

As shown in the experimental results of FIG. 13, when a foreign object is placed in the charging area, the value of the peak frequency having a maximum quality factor value becomes greater than the peak frequency before the foreign object is placed.

In addition, as shown in the experimental results of FIG. 13, it can be seen that the peak frequency is changed according to the position of the wireless power receiver placed in the charging area.

Accordingly, when the reference peak frequency received from the wireless power receiver is determined as the foreign object detection reference frequency, the foreign object detection apparatus 1200 may mis-determine peak frequency change according to receiver position change as peak frequency change due to a foreign object placed in the charging area. In order to solve this, the foreign object detection reference frequency according to an embodiment may be determined in consideration of the reference peak frequency value and a predetermined tolerance value corresponding to peak frequency change according to receiver movement. For example, if the tolerance value is 5 kHz, the foreign object detection reference peak frequency may be set to a sum of the reference peak frequency and 5 kHz.

However, according to the below-described experimental results, it can be seen that increment (or increase ratio) of the peak frequency value according to foreign object placement is greater than increment (or deviation) of the peak frequency according to movement of the receiver in the charging area. Accordingly, the detection unit 1250 according to one embodiment may determine whether the current peak frequency value is greater or less than the foreign object detection reference frequency value and accurately determine whether the current peak frequency has been changed from the reference peak frequency due to the foreign object or due to movement of the receiver.

In addition, according to the below-described experimental results, it can be seen that increment (or increase ratio) of the peak frequency value according to foreign object placement is greater than increment (or deviation) of the peak frequency according to the difference between the types of the wireless power transmitters. Accordingly, the detection unit 1250 according to one embodiment may determine whether the current peak frequency value is greater or less than the foreign object detection reference frequency value and accurately determine whether the current peak frequency has been changed from the reference peak frequency due to the foreign object or due to the difference between the transmitters.

Upon determining that the foreign object is present on the wireless power transmission path, the detection unit 1250 may stop power transfer and control the alarm unit 1260 to output a predetermined warning alarm indicating that the foreign object has been detected. For example, the alarm unit 1160 may include a beeper, an LED lamp, a vibration element, and a liquid crystal display, without being limited thereto. Any alarm unit capable of notifying the user of foreign object detection may be used.

The reference quality factor value included in the foreign object detection status packet may be predetermined through experimentation on a specific wireless power transmitter (or a measurement apparatus) designated for standard performance test and receiver authentication and may be set in the wireless power receiver. For example, the smallest value of the quality factor values measured in correspondence with the wireless power receiver at a plurality of designated positions in the charging area, for example, a charging pad provided on the wireless power transmitter or the measurement apparatus, may be determined as the reference quality factor value.

When the foreign object is detected in the negotiation phase, the controller 1290 may transmit a negative acknowledgement signal to the wireless power receiver in response to the foreign object detection status packet. Therefore, the wireless power receiver may transmit an end-of-charge message to the wireless power transmitter. The wireless power transmitter may stop power transfer and return to the selection phase, when the end-of-charge message is received.

The controller 1290 may perform the foreign object detection procedure again after returning to the selection phase and determine whether the detected foreign object has been removed from the charging area. Upon determining that the foreign object has been removed, the controller 1290 may enter the power transfer phase and perform charging of the wireless power reception apparatus.

In addition, the controller 1290 may monitor whether a response signal, for example, a signal strength packet, is normally received in the ping phase. For example, the controller 1290 may monitor whether the signal strength packet corresponding to the digital ping is normally received and calculate the number of times that the signal strength packet is not normally received, that is, the communication error count.

In addition, the controller 1290 may monitor whether the identification and configuration packet is normally received in the identification and configuration phase. Specifically, the controller 1180 may monitor whether the identification and configuration packet is normally received and calculate the number of times that the identification and configuration packet is not normally received, that is, the communication error count.

For example, the controller 1290 may determine that reception of the identification and configuration packet has failed, when the identification packet is not normally received within a predetermined first time after the signal strength packet is normally received.

In another example, the controller 1290 may determine that reception of the identification and configuration packet has failed when a series of identification packets is not sequentially received within a predetermined second time after the signal strength packet is normally received.

Hereinafter, for convenience of description, the number of packet reception failures in the ping phase and/or the identification and configuration phase is referred to as a communication error count.

For example, the controller 1290 may determine that a foreign object is present, when the foreign object detection reference frequency value is greater than the current peak frequency value and the communication error count exceeds a predetermined communication error reference value.

In contrast, the controller 1290 may determine that a foreign object is not present, when the foreign object detection reference frequency value is greater than the current peak frequency value but the communication error count is equal to or less than the predetermined communication error reference value.

Figure 8:
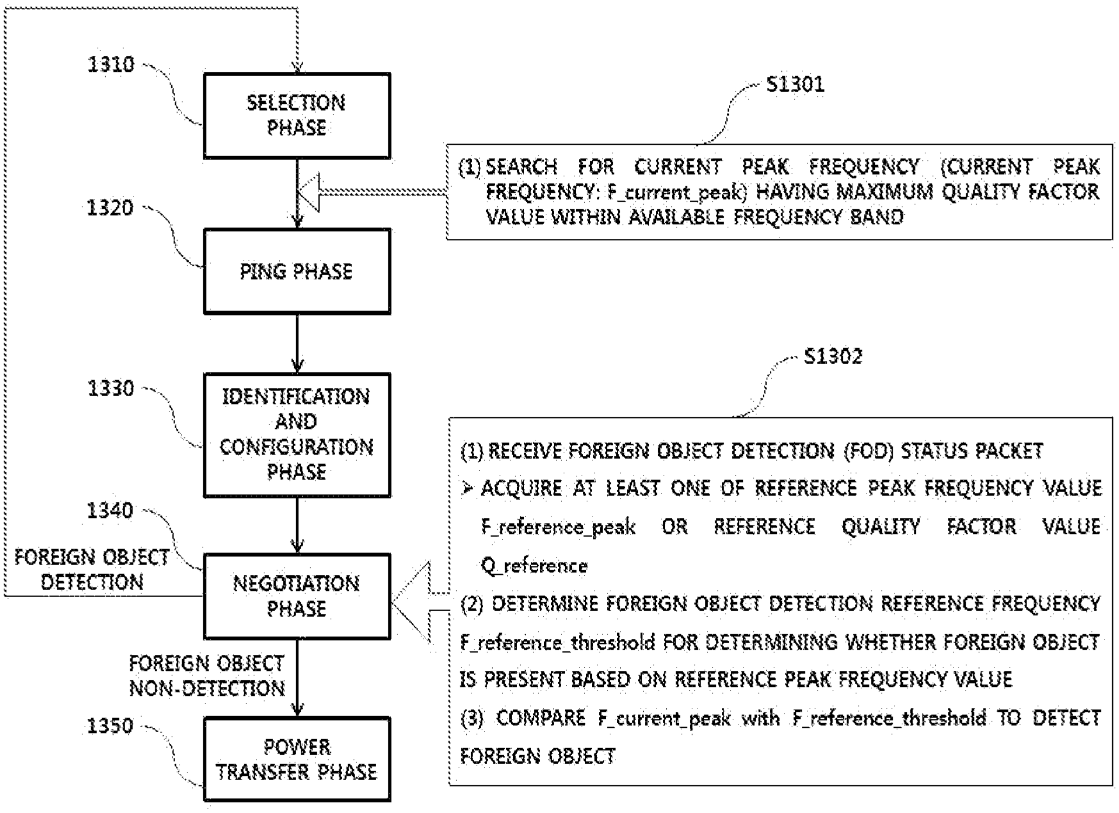
FIG. 8 is a state transition diagram illustrating a foreign object detection procedure of a foreign object detection apparatus according to an embodiment.

FIG. 8 is a state transition diagram illustrating a foreign object detection procedure of a foreign object detection apparatus according to an embodiment.

Referring to FIG. 8, when the object is detected in the selection phase 1310, the wireless power transmitter may search for a frequency having a maximum quality factor value, that is, a current peak frequency F_current_peak or a resonant frequency, within an available frequency band before entering the ping phase 1320. The foreign object detection apparatus may store information on the searched current peak frequency in a predetermined recording region of the memory.

When entering the ping phase 1320, the foreign object detection apparatus may transmit a predetermined power signal for identifying the wireless power receiver, for example, a digital ping.

When a response signal to the power signal transmitted in the ping phase 1320, for example, a signal strength packet, is received, the wireless power transmitter may enter the identification and configuration phase 1330 to identify the wireless power receiver and set various configuration parameters necessary for wireless power transmission to the identified wireless power receiver. In addition, the foreign object detection apparatus may determine whether the wireless power receiver identified in the identification and configuration phase 1330 is capable of receiving power.

When identification and configuration of the wireless power receiver normally ends, the wireless power receiver may enter the negotiation phase 1340 to perform a foreign object detection procedure.

The foreign object detection procedure may be performed through the following three steps.

In step 1, the wireless power transmitter may receive at least one foreign object detection status packet from the identified wireless power receiver. Here, the foreign object detection status packet may include at least one of information on the reference peak frequency value or information on the reference quality factor value measured at the reference peak frequency.

In step 2, the wireless power transmitter may determine a foreign object detection reference frequency for determining whether a foreign object is present based on the received reference peak frequency value. Here, the foreign object detection reference frequency may be determined in consideration of a tolerance value of peak frequency change according to movement of the receiver in the charging area in addition to the reference peak frequency value. For example, if the tolerance value is 5 kHz, the foreign object detection reference peak frequency may be determined by a sum of the reference peak frequency and 5 kHz.

In step 3, the wireless power transmitter may compare the current peak frequency with the foreign object detection reference frequency to determine whether a foreign object is present on the wireless power transmission path. The foreign object detection apparatus may determine that the foreign object is present when the current peak frequency is greater than the foreign object detection reference frequency. In contrast, the foreign object detection apparatus may determine that the foreign object is not present when the current peak frequency is less than the foreign object detection reference frequency.

Upon determining that the foreign object is present, the wireless power transmitter may transmit a negative acknowledgement signal to the wireless power receiver in response to the FOD status packet. Therefore, the wireless power receiver may transmit an end-of-charge message to the wireless power transmitter. The wireless power transmitter may stop power transfer and return to the selection phase 1310, when the end-of-charge message is received. At this time, the wireless power transmitter may output a predetermined warning alarm message indicating that the foreign object has been detected using an alarm unit.

In another example, when the foreign object is detected, a predetermined warning alarm message indicating that the foreign object has been detected may be transmitted to the wireless power receiver before entering the selection phase 1310. Subsequently, the wireless power receiver may transmit a message for requesting power transfer end, for example, End of Power Transfer Packet, to the wireless power transmitter according to the warning alarm message.

In contrast, upon determining that the foreign object is not present, the wireless power transmitter may enter the power transfer phase 1350 and perform wireless charging with respect to the wireless power receiver.

Figure 9:
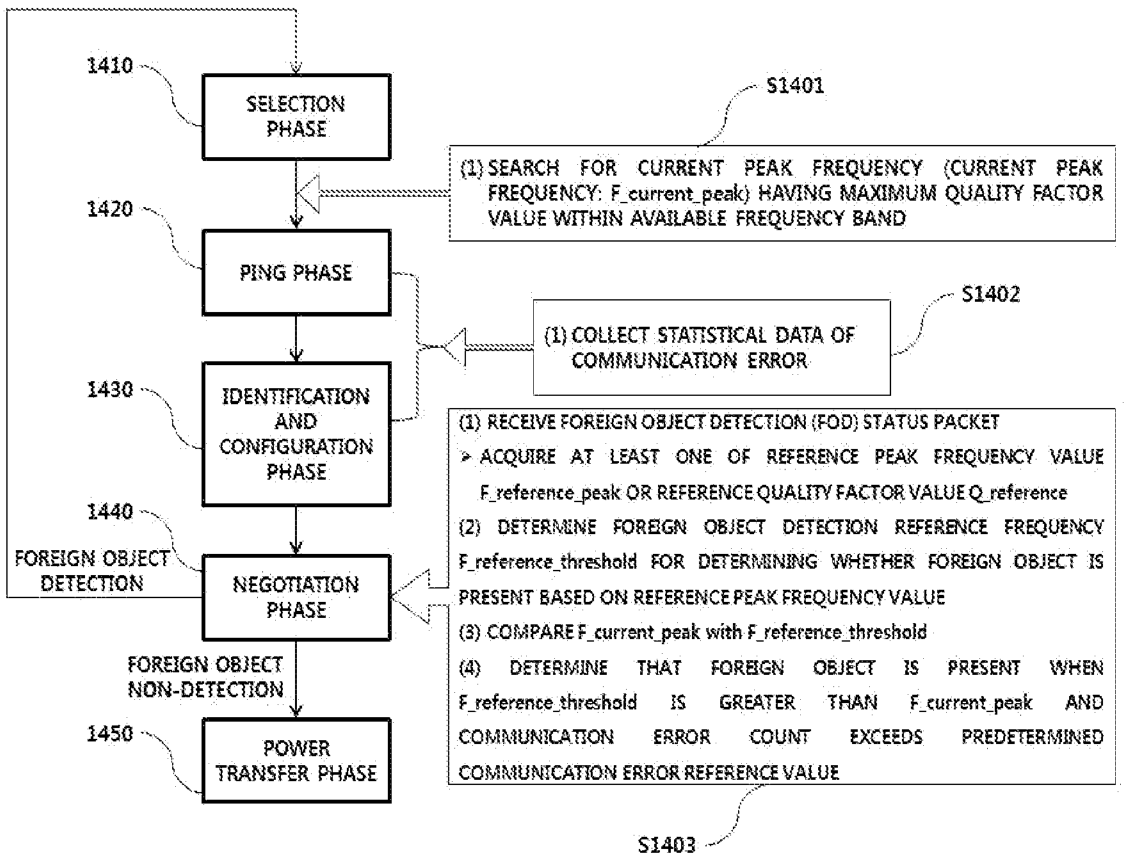
FIG. 9 is a state transition diagram illustrating a foreign object detection procedure of a foreign object detection apparatus according to another embodiment.

FIG. 9 is a state transition diagram illustrating a foreign object detection procedure of a foreign object detection apparatus according to another embodiment.

Referring to FIG. 9, when the object is detected in the selection phase 1410, the foreign object detection apparatus may search for a frequency having a largest quality factor value, that is, a current peak frequency F_current_peak, in the available frequency band before entering the ping phase 1420.

Upon entering the ping phase 1420, the foreign object detection apparatus may transmit a predetermined power signal for identifying the wireless power receiver, for example, a digital ping. At this time, the foreign object detection apparatus may monitor the reception state of a response signal corresponding to the power signal, for example, a signal strength packet, and collect communication error statistical data.

When the response signal is not normally received, the foreign object detection apparatus may repeatedly transmit the power signal and collect statistical data on the number of reception failures of the response signal. When the number of reception failures of the response signal exceeds a predetermined reference value, the foreign object detection apparatus may enter the selection phase 1410 or end all power transfer for a predetermined time.

When the response signal to the power signal transmitted in the ping phase 1420 is normally received, the foreign object detection apparatus may enter the identification and configuration phase 1430 to identify the wireless power receiver and set various configuration parameters necessary for wireless power transmission to the identified wireless power receiver.

In addition, the foreign object detection apparatus may determine whether the wireless power receiver identified in the identification and configuration phase 1430 is capable of receiving power.

The foreign object detection apparatus may return to the selection phase 1410 when the identification and configuration packet is not normally received. At this time, the foreign object detection apparatus may collect statistical data on the number of reception failures of the identification and configuration packet.

When the number of reception failures of the identification and configuration packet exceeds a predetermined reference value, the foreign object detection apparatus may enter the selection phase 1410 or end all power transfer for a predetermined time.

When the number of reception failures of the response signal and/or the identification and configuration packet exceeds a predetermined reference value, transfer of the power signal, that is, the power signal including the analog ping transmitted in the selection phase 1410, is interrupted for a predetermined time, thereby minimizing unnecessary power waste. If the number of times of interrupting power exceeds a predetermined reference value, the foreign object detection apparatus may output a predetermined warning alarm indicating that the object placed in the charging area needs to be removed.

For example, the foreign object detection apparatus may manage the cumulative total of the number of reception failures of the response signal in the ping phase 1420 and the number of reception failures of the identification and configuration packet in the identification and configuration phase 1430 as the communication error count.

When the identification and configuration of the wireless power receiver normally ends, the foreign object detection apparatus may enter the negotiation phase 1440 to perform the foreign object detection procedure.

The foreign object detection procedure may be performed through the following four steps.

In step 1, the foreign object detection apparatus may receive at least one foreign object detection status packet from the identified wireless power receiver. Here, the foreign object detection status packet may include at least one of information on the reference peak frequency and information on the reference quality factor value measured at the reference peak frequency.

In step 2, the foreign object detection apparatus may determine a foreign object detection reference frequency for determining whether a foreign object is present based on the received reference peak frequency value. Here, the foreign object detection reference frequency may be determined in consideration of a tolerance value of peak frequency change according to movement of the receiver in the charging area in addition to the reference peak frequency value. For example, if the tolerance value is 5 kHz, the foreign object detection reference peak frequency may be determined by a sum of the reference peak frequency and 5 kHz.

In step 3, the foreign object detection apparatus may compare the current peak frequency value with the foreign object detection reference frequency value.

In step 4, when the foreign object detection reference frequency value is greater than the current peak frequency value as the result of comparison, the foreign object detection apparatus may determine whether the communication error count exceeds a predetermined communication error reference value.

Upon determining that the communication error count exceeds the predetermined communication error reference value, the foreign object detection apparatus may determine that the foreign object is present on the wireless power transmission path. Upon determining that the foreign object is present, the foreign object detection apparatus may end wireless charging and return to the selection phase 1410. At this time, the foreign object detection apparatus may output a predetermined warning alarm message indicating that the foreign object has been detected using an internal alarm unit. In another example, when the foreign object is detected, the foreign object detection apparatus may transmit a predetermined warning alarm message indicating that the foreign object has been detected to the wireless power receiver before entering the selection phase 1410. Subsequently, the wireless power receiver may transmit a message for requesting power transfer end, for example, End of Power Transfer Packet, to the wireless power transmitter according to the warning alarm message.

In contrast, upon determining that foreign object is not present, the foreign object detection apparatus may enter the power transfer phase 1450 to perform wireless charging with respect to the wireless power receiver.

FIG. 10 is a view illustrating the structure of an FOD status packet message according to one embodiment.

Referring to FIG. 10, the FOD status packet message 1500 may have a length of 2 bytes, and include a first data 1501 field having a length of 6 bits, a mode 1502 field having a length of 2 bits and a second data (reference quality factor value) 1503 field having a length of 1 byte.

For example, in the foreign object detection status packet message 1500, as denoted by reference numeral 1504, if the mode 1502 field is set to "00", all bits of the first data 1501 field are recorded with 0 and information corresponding to a reference quality factor value measured and determined in a state in which the wireless power receiver is powered off may be recorded in the second data 1503 field.

If the mode 1502 field is set to a binary value of "01", all bits of the first data 1501 field may be recorded with 0 and information corresponding to a reference peak frequency value may be recorded in the reference value 1503 field.

Here, the reference peak frequency value may mean a frequency having a largest quality factor value within an available frequency band in a state in which only the wireless power receiver is placed in the charging area. In addition, the reference peak frequency value is a value measured and determined on a designated specific measurement apparatus (or a specific wireless power transmitter) designated for authentication of the wireless power receiver.

In another example, in the foreign object detection status packet message 1500, as denoted by reference numeral 1505, if the mode 1502 field is set to "00", information corresponding to the reference peak frequency value may be recorded in the first data 1501 field and information corresponding to a reference quality factor value measured and determined in a state in which the wireless power receiver is powered off may be recorded in the second data 1503 field.

The offset (or resolution) of the reference peak frequency value recorded in the first data 1501 field may be determined based on the size of the data field and the size of the available (or operating) frequency band.

For example, since the size of the first data 1503 is 6 bits, the offset may have a value from 0 to 63. If the operating frequency bandwidth is 128 kHz, the resolution of the reference peak frequency value may be obtained by dividing the available frequency bandwidth by the number of first data 1501, that is, 128 kHz/64=2 kHz.

Figure 11:
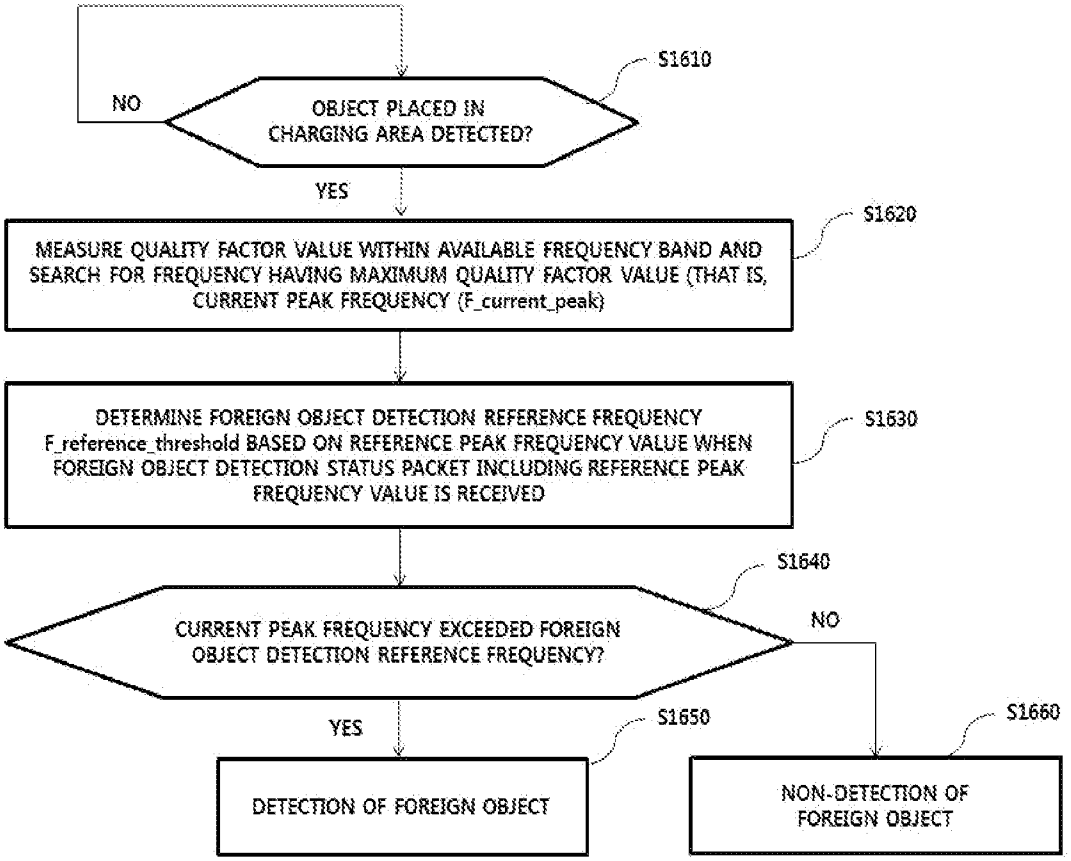
FIG. 11 is a flowchart illustrating a foreign object detection method in a wireless power transmission apparatus according to an embodiment.

FIG. 11 is a flowchart illustrating a foreign object detection method in a wireless power transmission apparatus according to an embodiment.

Referring to FIG. 11, the wireless power transmission apparatus may detect an object placed in the charging area in the selection phase (S1610). When the object is detected, the wireless power transmission apparatus search for a current peak frequency which is a frequency having a maximum quality factor value among the quality factor values measured at a plurality of frequencies within the available frequency band before entering the ping phase and store the current peak frequency in a predetermined recording region (S1620). Here, the number of frequencies for measuring the quality factor value for search for the current peak frequency within the available frequency band may be determined by a predetermined frequency offset. It should be noted that the frequency offset may be differently determined according to the design of those skilled in the art. In addition, the available frequency band may vary according to the standard applied to the wireless charging system.

In another embodiment, the wireless power transmission apparatus may detect and store a current peak frequency having a largest coil voltage (or a largest voltage across a resonant capacitor) within a predetermined frequency region (S1620). The wireless power transmission apparatus controls an operating frequency to sense a (frequency sweep) coil voltage (or a voltage across a resonant capacitor). For example, the wireless power transmission apparatus may measure a coil voltage (or a voltage across a resonant capacitor) while sweeping an operating frequency from a low frequency to a high frequency. The coil voltage (or the voltage across the resonant capacitor) gradually increases and then decreases while sweeping the frequency. At this time, when the decreasing voltage is sensed, the wireless power transmission apparatus may determine the operating frequency at that time as a resonant frequency (a current peak frequency).

The wireless power transmission apparatus may determine a foreign object detection reference frequency based on the reference peak frequency value (S1630), when the foreign object detection status packet including the reference peak frequency value is received in the negotiation phase.

The wireless power transmission apparatus may determine whether the current peak frequency value exceeds the foreign object detection reference frequency value (S1640).

Upon determining that the current peak frequency value exceeds the foreign object detection reference frequency value, the wireless power transmission apparatus may determine that the foreign object is detected (S1650).

Upon determining that the current peak frequency value is less than the foreign object detection reference frequency value, the wireless power transmission apparatus may determine that the foreign object is not detected (S1660).

Figure 12:
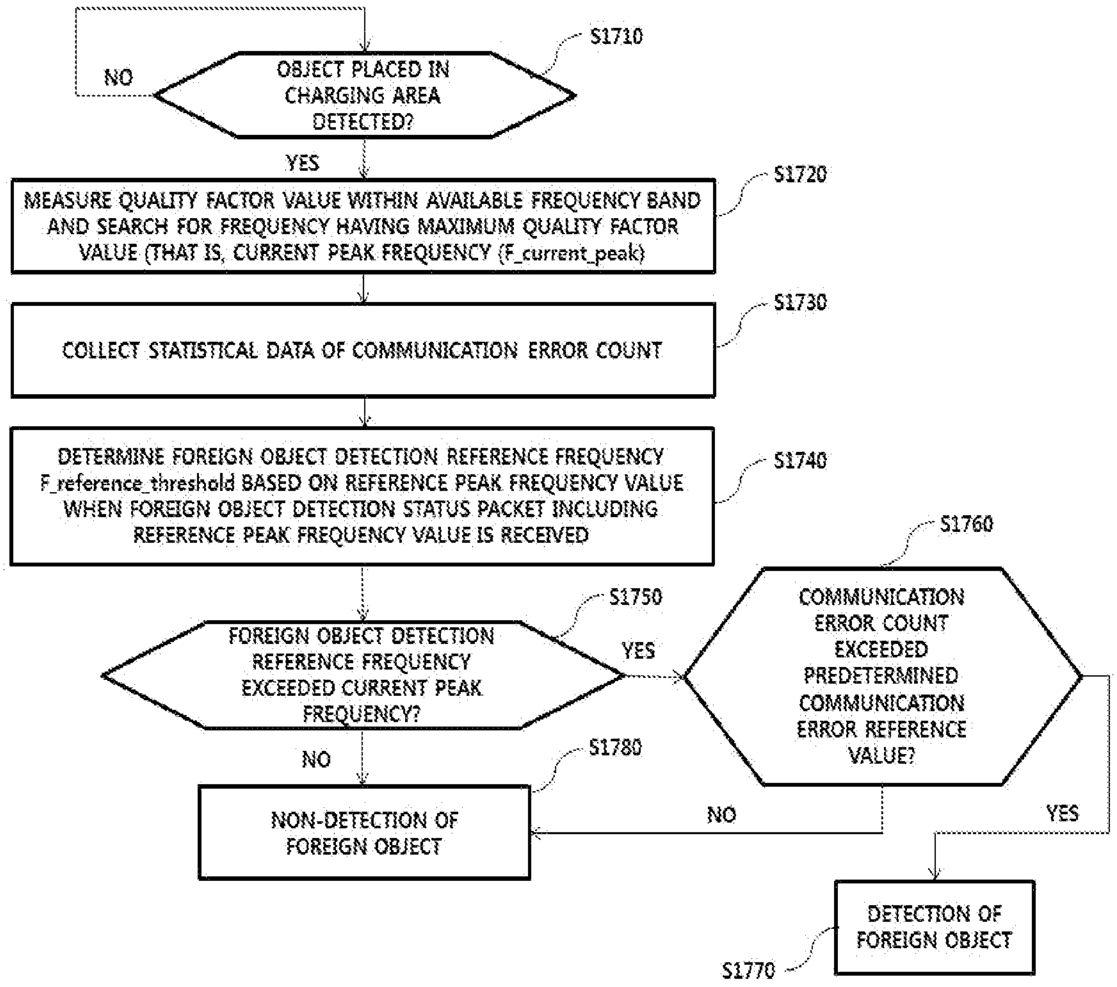
FIG. 12 is a flowchart illustrating a foreign object detection method in a wireless power transmission apparatus according to another embodiment.

FIG. 12 is a flowchart illustrating a foreign object detection method in a wireless power transmission apparatus according to another embodiment.

Referring to FIG. 12, the wireless power transmission apparatus may detect an object placed in the charging area in the selection phase (S1710). When the object is detected, the wireless power transmission apparatus may temporarily stop power transfer before entering the ping phase, search for a current peak frequency which is a frequency having a maximum quality factor value among the quality factor values measured at a plurality of frequencies within the available frequency band, and store the current peak frequency in a predetermined recording region (S1720). Here, the number of frequencies for measuring the quality factor value for search for the current peak frequency within the available frequency band may be determined by a predetermined frequency offset. It should be noted that the frequency offset may be differently determined according to the design of those skilled in the art. In addition, the available frequency band may vary according to the standard applied to the wireless charging system.

When the current peak frequency is searched, the wireless power transmission apparatus may collect the statistical data of the communication error count (S1730). Here, the statistical data may be collected in at least one of the ping phase or the identification and configuration phase.

For example, the wireless power transmission apparatus may transmit a digital ping in order to identify the receiver in the ping phase. The wireless power transmission apparatus may monitor whether the signal strength packet as the response signal corresponding to the digital ping in the ping phase is normally received and calculate a first communication error count corresponding to the ping phase.

In another example, when the signal strength packet is normally received in the ping phase, the wireless power transmission apparatus may enter the identification and configuration phase and monitor the reception state of the identification packet and the configuration packet. At this time, the wireless power transmission apparatus may calculate a second communication error count corresponding to the identification and configuration phase.

Of course, the wireless power transmission apparatus may calculate a third communication error count which is a sum of the first communication error count and the second communication error count.

When the foreign object detection status packet including the reference peak frequency value is received in the negotiation phase, the wireless power transmission apparatus may determine the foreign object detection reference frequency based on the reference peak frequency value (S1740).

The wireless power transmission apparatus may check whether the current peak frequency value exceeds the foreign object detection reference frequency value (S1750).

Upon determining that the current peak frequency value exceeds the foreign object detection reference frequency value, the wireless power transmission apparatus may check whether the communication error count exceeds a predetermined communication error reference value (S1760). Here, the communication error count may be any one of the first communication error count and the second communication error count.

Upon determining that the communication error count exceeds the predetermined communication error reference value in step 1760, the wireless power transmission apparatus may determine that the foreign object is detected (S1770).

Upon determining that the communication error count is less than the predetermined communication error reference value, the wireless power transmission apparatus may determine that the foreign object is not detected (S1780).

Of course, upon determining that the current peak frequency value is less than or equal to the foreign object detection reference frequency value in step 1750, the wireless power transmission apparatus may determine that the foreign object is not detected.

Accordingly, in the present embodiment, since whether the foreign object is present is determined based on a difference between the reference peak frequency stored in the wireless power receiver and the current peak frequency measured in the wireless power transmitter, it is possible to more accurately detect the foreign object.

FIG. 13 is an experimental result graph showing change in quality factor value and peak frequency according to placement of a foreign object in a wireless charging system according to an embodiment.

Referring to FIG. 13, when a first receiver and a foreign object are placed in the charging area, the peak frequency is greater than that of the case where only the first receiver is placed in the charging area by Lf. Hereinafter, for convenience of description, Δf is referred to as a peak frequency shift value. In contrast, it can be seen that the quality factor value measured at the peak frequency corresponding to the state in which the first receiver and the foreign object are placed in the charging area, that is, the current peak frequency, is less than the quality factor value measured at the peak frequency corresponding to the state in which only the first receiver is placed, that is, the reference peak frequency, by LQ. Hereinafter, for convenience of description, LQ is referred to as a quality factor shift value.

As shown in FIG. 13, results similar to the experimental result of the first receiver are obtained with respect to the remaining second to fourth receivers.

The foreign object detection apparatus according to an embodiment may calibrate the reference measurement quality factor value based on the peak frequency shift value and the quality factor shift value. For example, as the sum of the peak frequency shift value and the quality factor shift value increases, the calibration ratio of the reference quality factor value may increase.

In general, in the case of a wireless charging system, a resonant phenomenon occurs at a peak frequency having a maximum quality factor value and power efficiency is maximized.

FIG. 14 is an experimental result table illustrating a peak frequency of each receiver type and change in peak frequency according to placement of a foreign object according to an embodiment.

Referring to FIG. 14, it can be seen that the peak frequency 1910 acquired in the state in which only the wireless power receiver is placed in the charging area and the quality factor value 1920 measured at the peak frequency may have different values according to the type of the receiver.

In particular, referring to reference numerals 1910 and 1930, it can be seen that the peak frequency 1903 when not only the wireless power receiver but also the foreign object is placed in the charging area is greater than the peak frequency 1910 when only the wireless power receiver is placed.

In addition, referring to reference numerals 1920 and 1940, it can be seen that the quality factor value measured when the receiver and the foreign object are placed in the charging area is less than the quality factor value frequency when only the receiver is placed.

In addition, referring to reference numeral 1950, the peak frequency is decreased but the quality factor value is increased as the position of the foreign object placed in the charging area becomes farther from the center.

Figure 15:
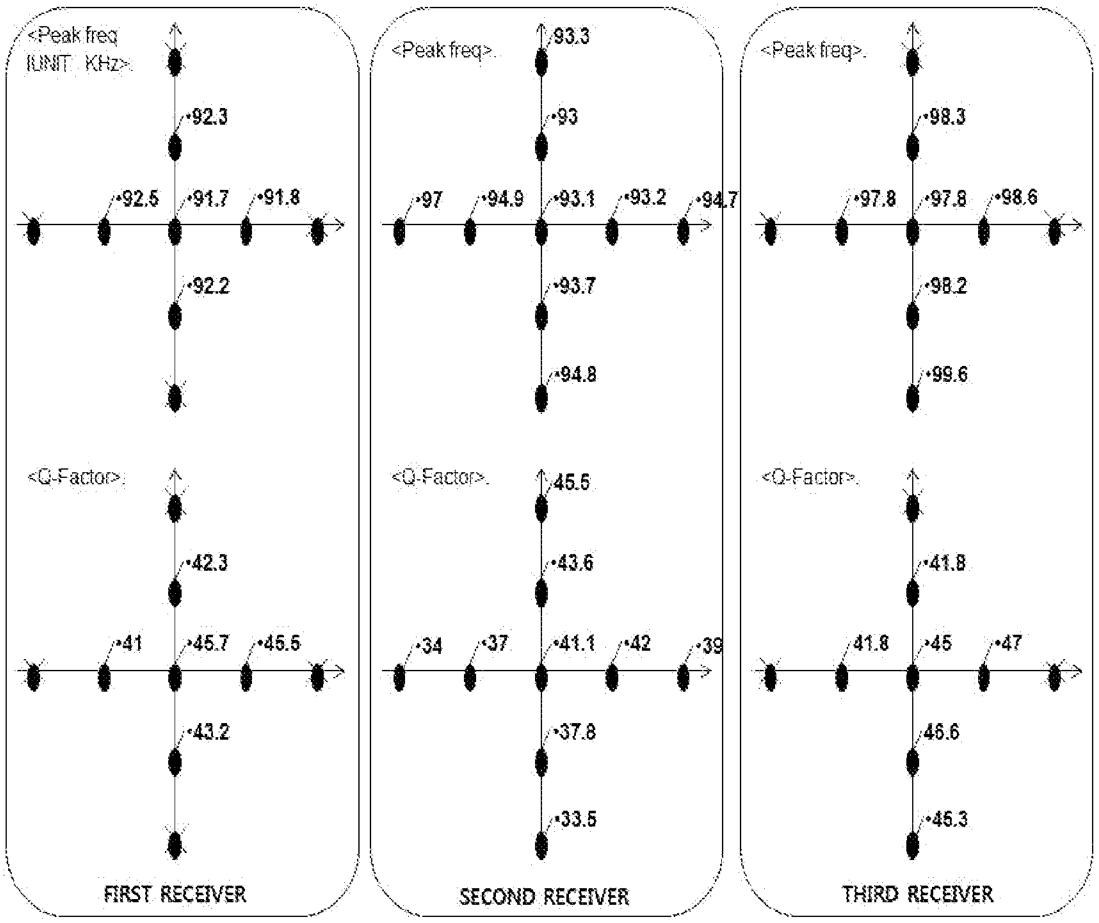
FIG. 15 is an experimental result table illustrating change in quality factor value and peak frequency according to movement of a wireless power receiver.

FIG. 15 is an experimental result table illustrating change in quality factor value and peak frequency according to movement of a wireless power receiver.

Figure 16:
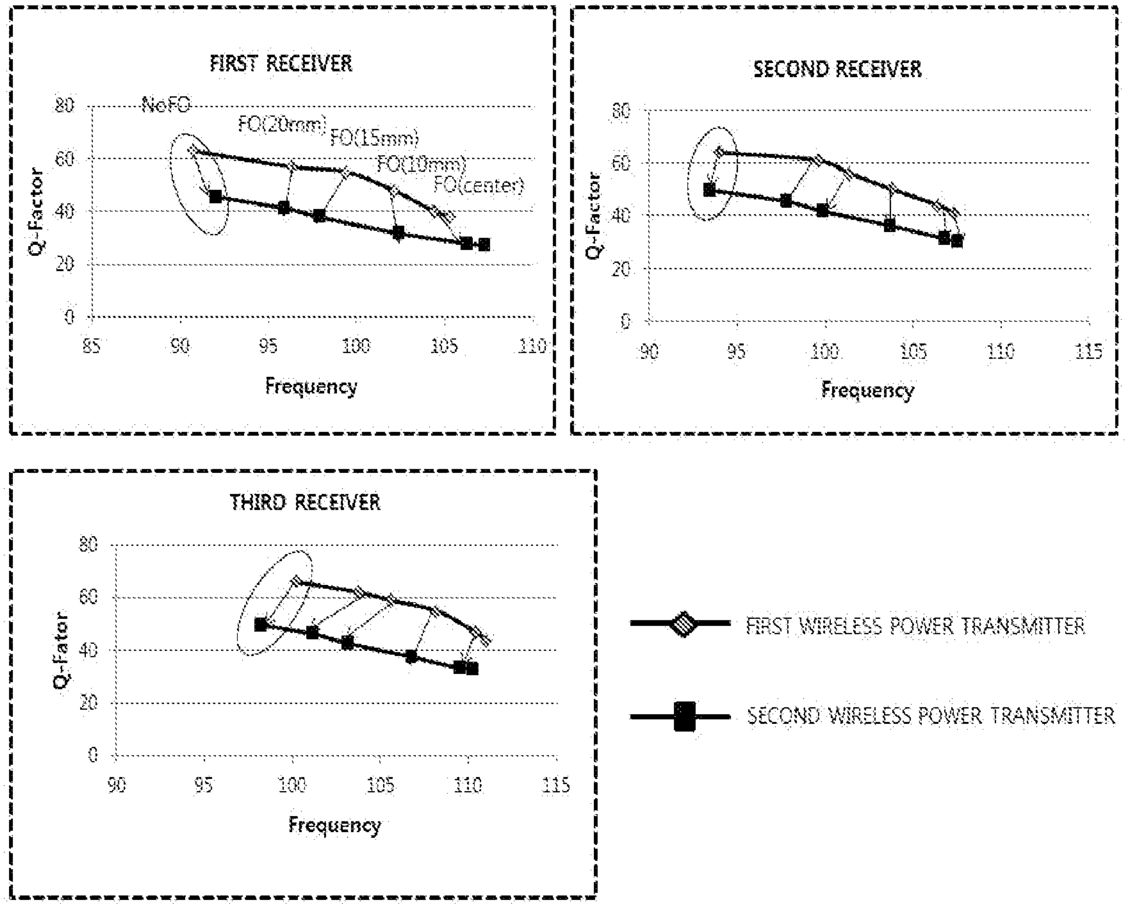
FIG. 16 is an experimental result showing change in peak frequency according to the type of a wireless power transmitter and presence/absence of a foreign object.
Figure 17:
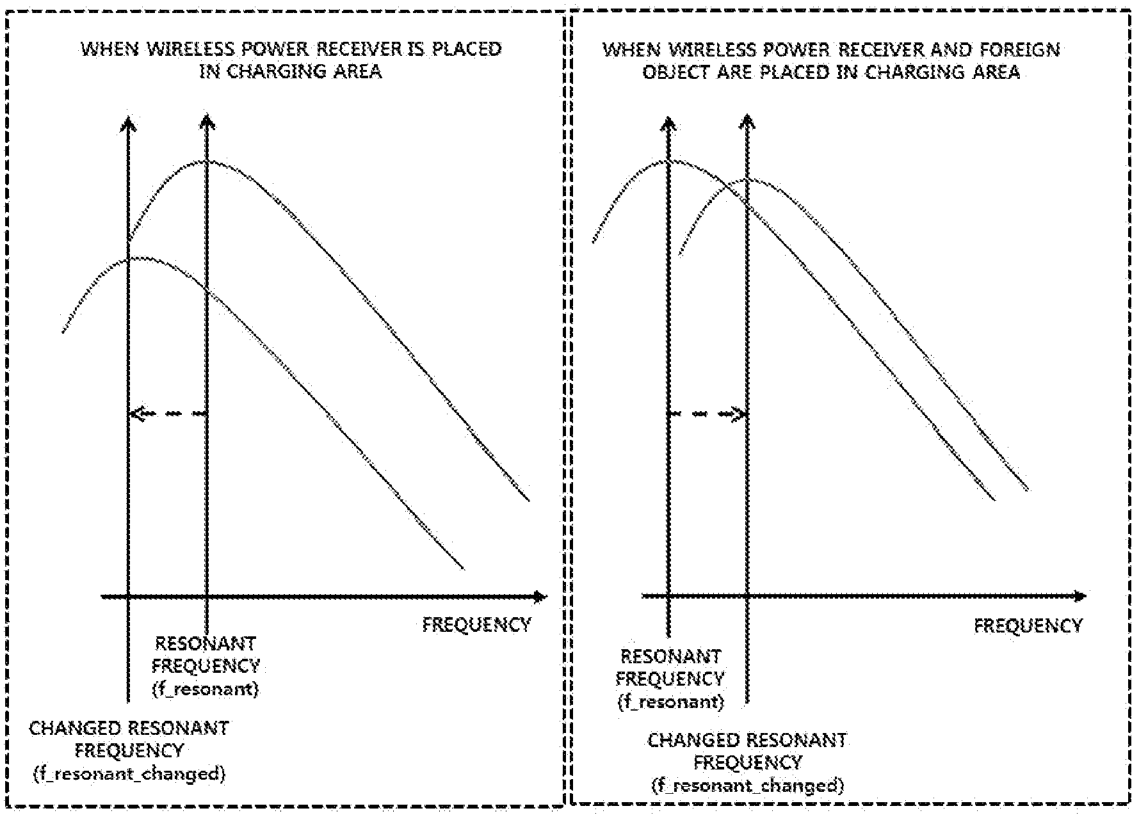
FIG. 17 is a graph illustrating change in quality factor value measured when a resonant frequency of a coil of a wireless power transmitter according to an embodiment is 100 kHz and a wireless power receiver or a foreign object is placed in a charging area.

Referring to FIG. 15, change in peak frequency and change in quality factor value of each of first to third receivers when the wireless power receiver is moved from the center of the charging bed at an interval of 5 mm in an up/down/left/right direction is shown. As shown in FIG. 16, it can be seen that maximum change in peak frequency according to movement of the receiver on the charging bed is less than 5 kHz.

FIG. 16 is an experimental result showing change in peak frequency according to the type of a wireless power transmitter and presence/absence of a foreign object.

As shown in FIG. 16, it is characterized in that change in peak frequency according to the type of the wireless power transmitter corresponding to each wireless power receiver is relatively less than change in peak frequency according to presence/absence of the foreign object within a specific wireless power transmitter.

In the present embodiment, based on the above characteristics, when the object is detected, the wireless power transmitter may measure the quality factor value within the available frequency band and search for the peak frequency. At this time, the wireless power transmitter may compare the searched peak frequency with the foreign object detection reference frequency determined based on the reference peak frequency and identify whether the peak frequency has been changed due to the foreign object or a difference between the types of the wireless power transmitters.

Accordingly, in the present embodiment, since presence/absence of the foreign object is determined based on the difference between the reference peak frequency stored in the wireless power receiver and the current peak frequency actually measured in the wireless power transmitter, it is possible to more accurately detect the foreign object.

The wireless power transmitter according to the present embodiment may determine the foreign object detection reference frequency for determining whether the foreign object is present based on the reference peak frequency value acquired from the wireless power receiver.

For example, the foreign object detection reference frequency may be determined in consideration of the reference peak frequency value and a tolerance value corresponding to peak frequency change according to the difference between the types of the wireless power transmitters. For example, if maximum peak frequency change according to the difference between the types of the wireless power transmitters is 5 kHz, the foreign object detection reference frequency may be set to a sum of the reference peak frequency value and 5 kHz.

In another example, the wireless power transmitter according to the present embodiment may determine the larger value of maximum peak frequency change according to movement of the receiver in the charging area and maximum peak frequency change according to the difference between the types of the wireless power transmitters as a tolerance value. At this time, the foreign object detection reference frequency may be set to a sum of the reference peak frequency value and the determined tolerance value.

The method according to the foregoing embodiments may be implemented as code that can be written to a computer-readable recording medium and can thus be read by a computer. Examples of the computer-readable recording medium include a ROM, a RAM, a CD-ROM, a magnetic tape, a floppy disk, an optical data storage, and a carrier wave (e.g., data transmission over the Internet).

The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Those skilled in the art will appreciate that the disclosure may be carried out in other specific ways than those set forth herein without departing from the spirit and essential characteristics of the disclosure.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Embodiments are applicable to a wireless power charging apparatus and are particularly applicable to a foreign object detection apparatus for detecting a foreign object placed in a charging area and a wireless power transmission apparatus having a foreign object detection function.

The invention claimed is:

1. A method of controlling a wireless power transmitter to detect a foreign object, the method comprising:

in response to a wireless power receiver being placed in a charging area of the wireless power transmitter, determining a current peak frequency;

collecting a communication error count related to communication between the wireless power transmitter and the wireless power receiver;

determining a reference frequency for detecting the foreign object based on a reference peak frequency received from the wireless power receiver; and determining that the foreign object is present within the charging area based on the current peak frequency, the communication error count and the reference frequency.

2. The method of claim 1, wherein the determining that the foreign object is present within the charging area includes:

in response to the current peak frequency exceeding the reference frequency for detecting the foreign object and the communication error count exceeding a communication error reference value, determining that the foreign object is present within the charging area.

3. The method of claim 2, wherein the communication error count is based on a number of packet reception failures in a ping phase between the wireless power transmitter and the wireless power receiver or a number of packet reception failures in an identification and configuration phase between the wireless power transmitter and the wireless power receiver.

4. The method of claim 2, further comprising:

determining that the foreign object is not detected within the charging area, when the current peak frequency does not exceed the reference frequency for detecting the foreign object.

5. The method of claim 2, further comprising:

determining that the foreign object is not detected within the charging area, when the current peak frequency exceeds the reference frequency for detecting the foreign object and the communication error count does not exceed a communication error reference value.

6. The method of claim 1, wherein the measuring the current peak frequency is carried out before a ping phase between the wireless power transmitter and the wireless power receiver.

7. The method of claim 1, wherein the reference frequency for detecting the foreign object is determined based on the reference peak frequency received from the wireless power receiver and a tolerance value.

8. The method of claim 7, wherein the determining the reference frequency for detecting the foreign object is carried out during a negotiation phase between the wireless power transmitter and the wireless power receiver or before a power transfer phase between the wireless power transmitter and the wireless power receiver.

9. The method of claim 7, wherein the determining the reference frequency for detecting the foreign object includes: adding the reference peak frequency and the tolerance value to generate a sum; and setting the reference frequency for detecting the foreign object to a value based on the sum.

10. The method of claim 1, wherein the current peak frequency is a frequency having a maximum quality factor value within an available frequency band.

* * * * *